United States Patent
Harrenstein et al.

(10) Patent No.: US 10,676,294 B2
(45) Date of Patent: Jun. 9, 2020

(54) MODULAR STORAGE BIN SWEEP SYSTEM

(71) Applicant: SIOUX STEEL COMPANY, Sioux Falls, SD (US)

(72) Inventors: Joe Harrenstein, Sioux Falls, SD (US); Brian Schuelke, Lennox, SD (US); Leroy B. Stumpe, Hartford, SD (US); Eric Schuld, Sioux Falls, SD (US)

(73) Assignee: Sioux Steel Company, Sioux Falls, SD (US)

(*) Notice: Subject to any disclaimer, the term of this patent is extended or adjusted under 35 U.S.C. 154(b) by 0 days.

(21) Appl. No.: 15/440,345

(22) Filed: Feb. 23, 2017

(65) Prior Publication Data

US 2017/0158443 A1 Jun. 8, 2017

Related U.S. Application Data

(63) Continuation-in-part of application No. 14/635,314, filed on Mar. 2, 2015, now Pat. No. 9,815,639, which (Continued)

(51) Int. Cl.
*A01F 25/20* (2006.01)
*B65G 65/42* (2006.01)
(Continued)

(52) U.S. Cl.
CPC ........ *B65G 65/425* (2013.01); *A01F 25/2018* (2013.01); *B65G 19/08* (2013.01); (Continued)

(58) Field of Classification Search
CPC ..... A01F 25/2018; B65G 19/08; B65G 21/12; B65G 65/425; B65G 65/4836; B65G 2201/042; B65G 2207/30
(Continued)

(56) References Cited

U.S. PATENT DOCUMENTS 822,547 A 6/1906 Nicolson
2,646,023 A 7/1953 Virgil
(Continued)

FOREIGN PATENT DOCUMENTS

CA 2312068 12/2001
FR 1032110 6/1953
(Continued)

OTHER PUBLICATIONS

G & G Manufacturing SC-X 4 Ratchet Slip Clutches, Jun. 17, 2012, https://web.archive.org/web/20120617003451/http://www.ggmfg.com/Products/CouplersClutches/SCX4RatchetSlipClutches.aspx.
(Continued)

*Primary Examiner* — James Keenan
(74) *Attorney, Agent, or Firm* — Jeffrey A. Proehl; Woods, Fuller, Shultz & Smith, PC

(57) ABSTRACT

A modular storage bin sweep system utilizing paddles to sweep particulate matter across a floor may comprise a sweep assembly including at least two units connectable together. The assembly may comprise a plurality of interconnected paddles, a power unit configured to the paddles, a drive unit configured to move the sweep assembly with respect to a surface of the bin below the sweep assembly. In some embodiments, a traction enhancement structure may increase traction of the drive unit on the floor. In some embodiments, a pivot unit is configured to permit a degree of pivotability of the axes of the units with respect to each other, and may be combined with a drive unit. In some embodiments, the power unit includes a rotary electrical power transfer structure configured to transfer electrical power to the power unit when rotating in the bin.

19 Claims, 22 Drawing Sheets

Related U.S. Application Data is a continuation of application No. 13/229,406, filed on Sep. 9, 2011, now Pat. No. 8,967,937.

(51) Int. Cl.
  *B65G 65/48* (2006.01)
  *B65G 19/08* (2006.01)
  *B65G 65/28* (2006.01)

(52) U.S. Cl.
  CPC .......... *B65G 65/4836* (2013.01); *B65G 65/28* (2013.01); *B65G 2207/30* (2013.01)

(58) Field of Classification Search
  USPC ............... 198/860.1, 860.3, 860.4, 861.3
  See application file for complete search history.

(56) References Cited

U.S. PATENT DOCUMENTS

| | | | |
|---|---|---|---|
| 2,763,362 A | 9/1956 | Greaves | |
| 2,801,137 A | 7/1957 | Clay | |
| 3,014,575 A | 12/1961 | Klein | |
| 3,035,718 A | 5/1962 | Behlen | |
| 3,065,996 A | 11/1962 | Patz | |
| 3,067,914 A | 12/1962 | Ellaby | |
| 3,175,676 A | 3/1965 | Vander Schaaf | |
| 3,181,715 A | 5/1965 | Olson | |
| 3,204,786 A | 9/1965 | Kucera | |
| 3,228,514 A | 1/1966 | Kucera | |
| 3,229,665 A | 1/1966 | Baltz | |
| 3,229,827 A | 1/1966 | Kucera | |
| 3,231,106 A | 1/1966 | Bruecker | |
| 3,291,325 A | 12/1966 | Henningson | |
| 3,338,636 A | 8/1967 | Chapman | |
| 3,438,517 A | 4/1969 | Steffen | |
| 3,451,567 A | 6/1969 | Laidig | |
| 3,455,470 A | 7/1969 | Kanagy | |
| 3,472,357 A | 10/1969 | Strocker | |
| 3,486,643 A | 12/1969 | Smith | |
| 3,532,232 A | 10/1970 | Sukup | |
| 3,647,094 A | 3/1972 | Jackson | |
| 3,828,916 A | 8/1974 | Patz | |
| 3,838,780 A | 10/1974 | Ridlehuber | |
| 3,908,840 A | 9/1975 | Lambert | |
| 3,946,496 A | 3/1976 | Sukup | |
| 3,946,861 A | 3/1976 | Sandefur | |
| 3,974,908 A | 8/1976 | Keichinger | |
| 4,022,335 A | 5/1977 | Lambert | |
| RE29,309 E | 7/1977 | Patterson | |
| 4,057,151 A | 11/1977 | Weaver | |
| 4,242,028 A | 12/1980 | Van Dusen | |
| 4,313,705 A | 2/1982 | Jackson | |
| 4,329,105 A | 5/1982 | Buschbom | |
| 4,516,898 A | 5/1985 | Cantenot | |
| 4,578,012 A | 3/1986 | Petit | |
| 4,585,385 A * | 4/1986 | Buschbom | B65G 65/466 198/813 |
| 4,619,330 A | 10/1986 | Machnee | |
| 4,619,577 A | 10/1986 | Swanson | |
| 4,655,666 A | 4/1987 | Cantenot | |
| 4,658,911 A | 4/1987 | Drever | |
| 4,669,941 A | 6/1987 | West | |
| 4,762,220 A | 8/1988 | Lutke | |
| 4,773,808 A | 9/1988 | Fischer | |
| 4,775,278 A | 10/1988 | Fischer | |
| 4,824,312 A | 4/1989 | Schiltz | |
| 4,875,820 A | 10/1989 | Lepp | |
| 4,998,855 A | 3/1991 | Tschernatsch | |
| 5,088,871 A | 2/1992 | Mellish | |
| 5,099,983 A | 3/1992 | Valdez | |
| 5,186,596 A | 2/1993 | Boucher | |
| 5,203,802 A | 4/1993 | Denis | |
| 5,639,200 A | 6/1997 | Jiskoot | |
| 5,769,590 A | 6/1998 | Weikel | |
| 5,788,055 A | 8/1998 | Stewart | |
| 5,947,261 A | 9/1999 | Baker | |
| 6,017,180 A | 1/2000 | Wilham | |
| 6,039,647 A | 3/2000 | Weikel | |
| 6,203,261 B1 | 3/2001 | South | |
| 6,254,329 B1 | 7/2001 | Sukup | |
| 6,280,331 B1 | 8/2001 | Tuttlebee | |
| 6,281,610 B1 | 8/2001 | Kliman | |
| 6,499,930 B1 | 12/2002 | Dixon | |
| 6,619,473 B2 * | 9/2003 | Romeo | B65G 21/02 198/836.1 |
| 6,640,451 B1 | 11/2003 | Vinarcik | |
| 6,948,902 B2 | 9/2005 | Hanig | |
| 7,210,538 B2 | 5/2007 | Gust | |
| 7,544,031 B2 | 6/2009 | Kaeb | |
| 7,588,405 B2 | 9/2009 | Johnson | |
| 7,967,542 B2 | 6/2011 | Epp | |
| 8,657,025 B2 | 2/2014 | Thompson | |
| 8,770,388 B1 | 7/2014 | Chaon | |
| 9,120,633 B2 | 9/2015 | Ahlen | |
| 9,199,807 B1 | 12/2015 | Schuelke | |
| 9,288,946 B1 | 3/2016 | Schuld | |
| 9,290,335 B1 | 3/2016 | Witt | |
| 9,862,545 B2 * | 1/2018 | Kaeb | B65G 21/08 |
| 10,011,442 B2 * | 7/2018 | Witt | B65G 65/425 |
| 10,227,188 B1 * | 3/2019 | Chaon | B65G 65/425 |
| 10,238,042 B2 * | 3/2019 | Ahlen | B65G 65/40 |
| 2004/0146381 A1 | 7/2004 | Hanson | |
| 2004/0213650 A1 | 10/2004 | Epp | |
| 2005/0254922 A1 | 11/2005 | Berreau | |
| 2005/0263372 A1 | 12/2005 | Hollander | |
| 2006/0245864 A1 | 11/2006 | Epp | |
| 2006/0285942 A1 | 12/2006 | Fridgen | |
| 2009/0041566 A1 | 2/2009 | Lambertini | |
| 2010/0239399 A1 | 9/2010 | Hoogestraat | |
| 2013/0064629 A1 | 3/2013 | Schuelke | |
| 2013/0216341 A1 | 8/2013 | Luster | |
| 2015/0225190 A1 * | 8/2015 | Witt | B65G 65/425 414/306 |

FOREIGN PATENT DOCUMENTS

| | | |
|---|---|---|
| FR | 2309442 | 11/1976 |
| FR | 2348132 | 11/1977 |
| FR | 2630620 | 11/1989 |
| GB | 1327791 | 8/1973 |
| GB | 2069448 | 8/1981 |
| GB | 2076357 | 12/1981 |

OTHER PUBLICATIONS

Sudenga Industries, Inc., Press Release, Nov. 1, 2004, pp. 1-3.
Wen-Bin Du, Qun Fang, Qiao-Hong He, and, and Zhao-Lun Fang. "High-Throughput Nanoliter Sample Introduction Microfluidic Chip-Based Flow Injection Analysis System with Gravity-Driven Flows", Analytical Chemistry 2005 77 (5), pp. 1330-1337.
Jayas, Digvir S., and Noel DG White. "Storage and drying of grain in Canada: low cost approaches." Food control 14.4 (2003): pp. 255-261.

\* cited by examiner

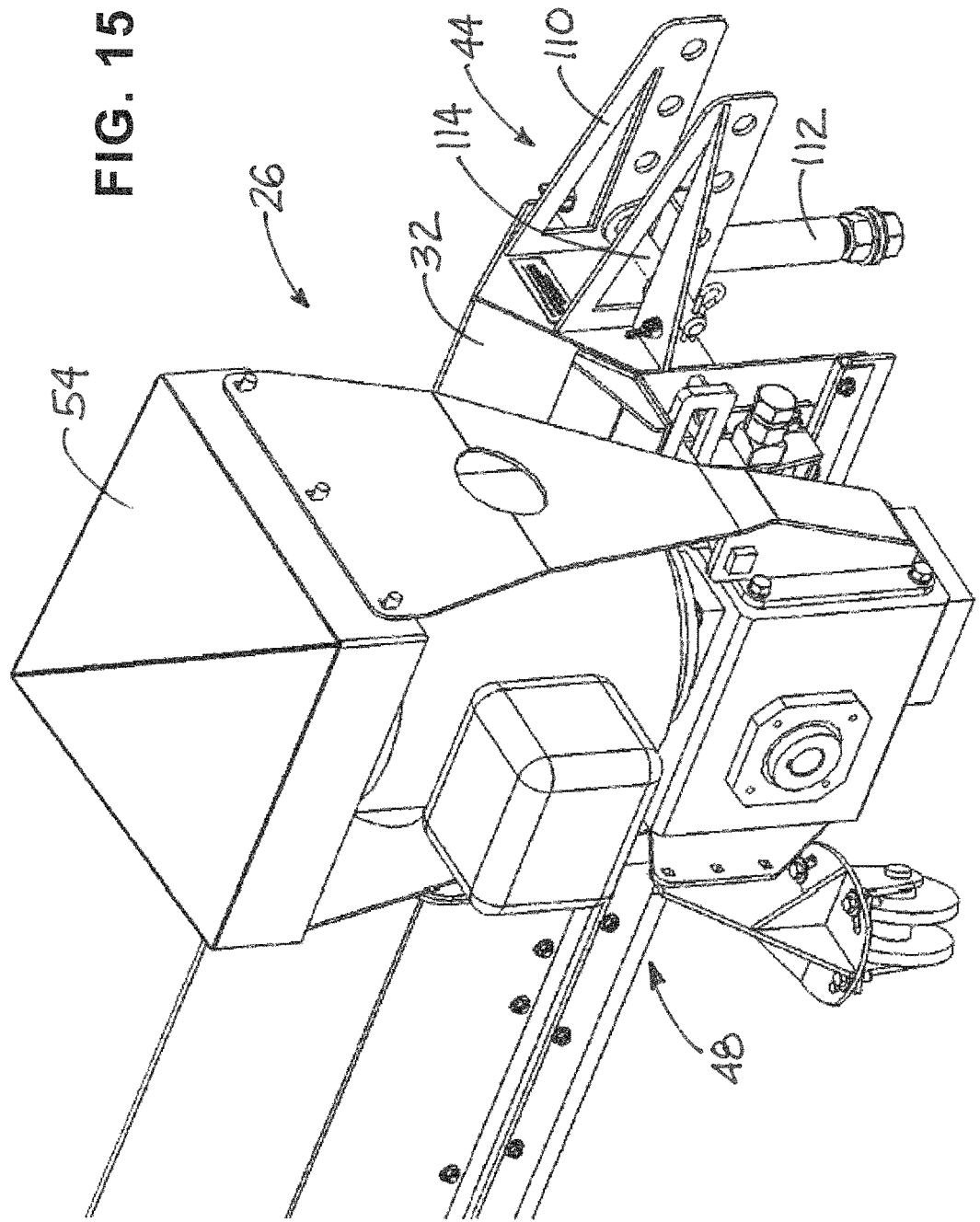

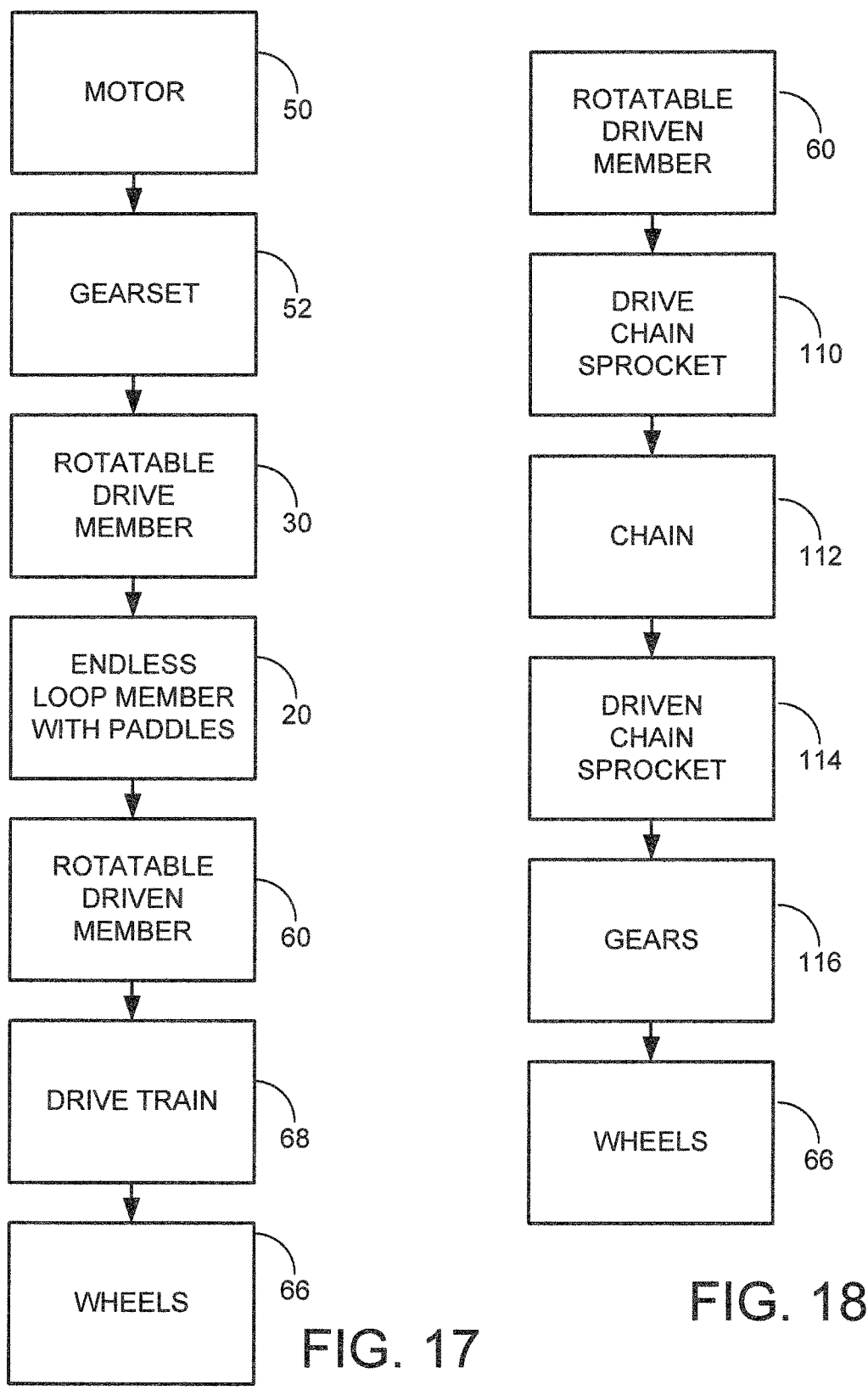

MODULAR STORAGE BIN SWEEP SYSTEM

REFERENCE TO RELATED APPLICATIONS

This application is a continuation in part of U.S. patent application Ser. No. 14/635,314, filed Mar. 2, 2015, which is a continuation of U.S. patent application Ser. No. 13/229,406 filed Sep. 9, 2011 and issued as U.S. Pat. No. 8,967,937, each of which is hereby incorporated by reference in their entireties.

BACKGROUND

Field

The present disclosure relates to bin sweeps and more particularly pertains to a new modular storage bin sweep system for clearing particulate material from the bin in a highly adaptable, reliable, and safe manner.

Description of the Prior Art

Sweep systems have been utilized in storage bins for moving particulate matter across the floor of the bin to a desired location, such as a sump located at the center of the bin, where the particulate matter may be transported under the floor and out of the bin. Conventionally, augers with helical flighting have been utilized to contact the particulate matter and move it towards the sumps by rotating the auger. Such sweep systems, although commonly used, present challenges in that the augers often become clogged or jammed with agglomerations of the particulate material, especially grain, and clearing the clogging matter from the flighting of the augers can be dangerous to life and limb.

U.S. Pat. No. 6,499,930 issued to Carl R. Dixon on Dec. 31, 2002, the disclosure of which is hereby incorporated by reference herein in its entirety, discloses a bin sweep system that utilizes a plurality of paddles arrayed on an endless element to move the particulate matter rather than the conventional augers, and has advantages over auger-based systems in terms of resistance to clogging and safety to persons proximate to the operating system.

SUMMARY

In view of the foregoing, the present disclosure describes a new modular storage bin sweep system which may be utilized for clearing particulate material from the bin in a highly adaptable, reliable, and safe manner.

In one aspect, the present disclosure relates to a modular storage bin sweep system utilizing paddles to sweep particulate matter across a floor surface of a bin. The system may comprise a sweep assembly including at least two units connectable together in a substantially linear array, with the sweep assembly having an inboard end for locating toward a center of the bin and an outboard end for locating toward a peripheral area of the bin. The sweep assembly may comprise a plurality of interconnected paddles movable in a succession on a path along at least a portion of the sweep assembly between the inboard and outboard ends, and a power unit configured to carry a portion of the succession of interconnected paddles and move the succession of paddles along the path of the sweep assembly with the power unit being positioned toward the inboard end of the sweep assembly. The sweep assembly may comprise a drive unit configured to carry a portion of the succession of interconnected paddles and move the sweep assembly with respect to a surface of the bin below the sweep assembly, with the drive unit being positioned toward the outboard end from the inboard end of the sweep assembly. The drive unit may include a surface engaging portion configured to engage a surface below the sweep assembly and move the sweep assembly with respect to the surface, with the surface engaging portion comprising at least one surface engaging wheel resting on the surface of the bin. The sweep assembly may also include a traction enhancement structure configured to increase traction of the drive unit on the surface below the sweep assembly.

In another aspect, the present disclosure relates to a modular storage bin sweep system utilizing paddles to sweep particulate matter across a floor surface of a bin. The system may comprise a sweep assembly including at least two units connectable together in a substantially linear array, with the sweep assembly having an inboard end for locating toward a center of the bin and an outboard end for locating toward a peripheral area of the bin. The sweep assembly may comprise a plurality of interconnected paddles movable in a succession on a path along at least a portion of the sweep assembly between the inboard and outboard ends, and a power unit configured to carry a portion of the succession of interconnected paddles and move the succession of paddles along the path of the sweep assembly with the power unit being positioned toward the inboard end of the sweep assembly. The sweep assembly may comprise a drive unit configured to carry a portion of the succession of interconnected paddles and move the sweep assembly with respect to a surface of the bin below the sweep assembly, with the drive unit being positioned toward the outboard end from the inboard end of the sweep assembly. The drive unit may include a surface engaging portion configured to engage a surface below the sweep assembly and move the sweep assembly with respect to the surface, with the surface engaging portion comprising at least one surface engaging wheel resting on the surface of the bin. The sweep assembly may also include a pivot unit configured to carry a portion of the succession of interconnected paddles and to permit a degree of pivotability of the axes of the units with respect to each other in the substantially linear array of units of the sweep assembly. Also, in some embodiments, the power unit may include a motor portion configured to move the succession of interconnected paddles along the path.

In another aspect, the present disclosure relates to a modular storage bin sweep system utilizing paddles to sweep particulate matter across a floor surface of a bin. The system may comprise a sweep assembly including at least two units connectable together in a substantially linear array, with the sweep assembly having an inboard end for locating toward a center of the bin and an outboard end for locating toward a peripheral area of the bin. The sweep assembly may comprise a plurality of interconnected paddles movable in a succession on a path along at least a portion of the sweep assembly between the inboard and outboard ends, and a power unit configured to carry a portion of the succession of interconnected paddles and move the succession of paddles along the path of the sweep assembly with the power unit being positioned toward the inboard end of the sweep assembly. The sweep assembly may comprise a drive unit configured to carry a portion of the succession of interconnected paddles and move the sweep assembly with respect to a surface of the bin below the sweep assembly, with the drive unit being positioned toward the outboard end from the inboard end of the sweep assembly. The drive unit may include a surface engaging portion configured to engage a surface below the sweep assembly and move the sweep assembly with respect to the surface, with the surface engaging portion comprising at least one surface engaging wheel resting on the surface of the bin. The power unit includes a rotary electrical power transfer structure configured to transfer electrical power to the power unit when rotating in the bin.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 15 is a schematic perspective view of an embodiment of a power unit of the bin sweep system showing an embodiment of the center support.

FIG. 17 is a schematic diagram of elements of the system transmitting power from a motor of the system to the wheels of the system, according to an illustrative embodiment.

FIG. 18 is a schematic diagram of a portion of the elements depicted in FIG. 12 shown in greater detail.

DETAILED DESCRIPTION

Figure 1:
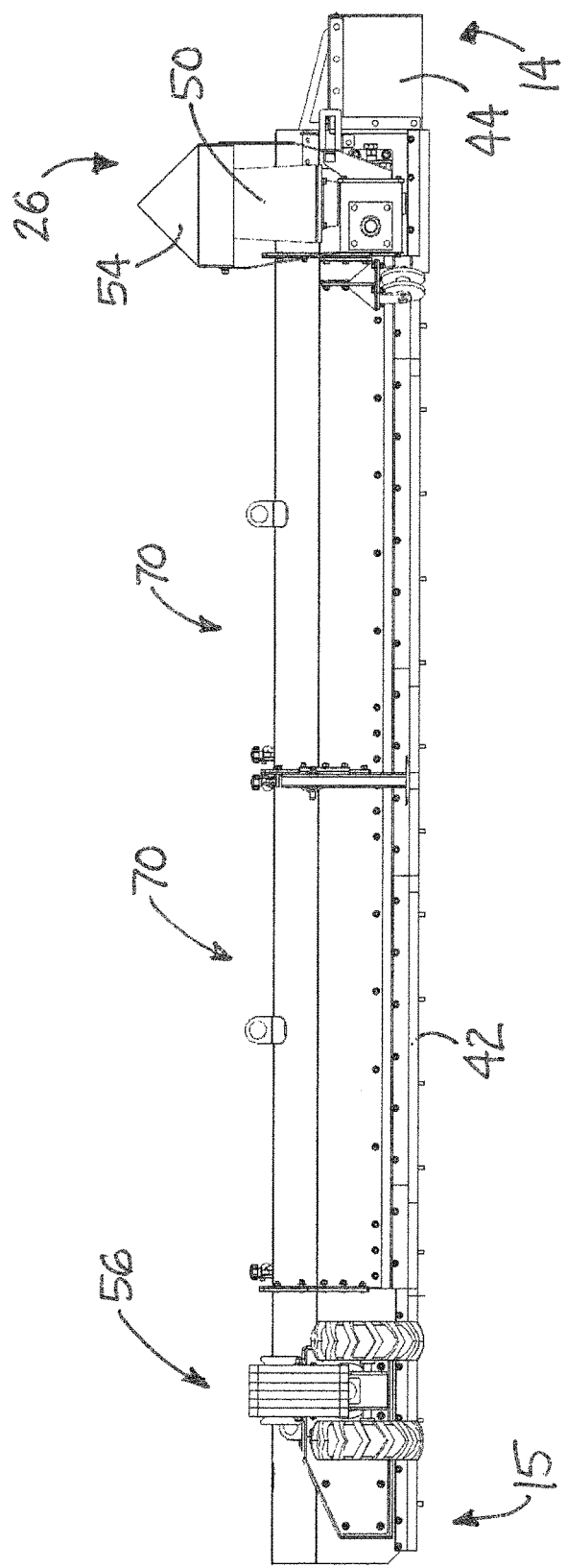
FIG. 1 is a schematic rear view of a new paddle bin sweep system according to the present disclosure.
Figure 2:
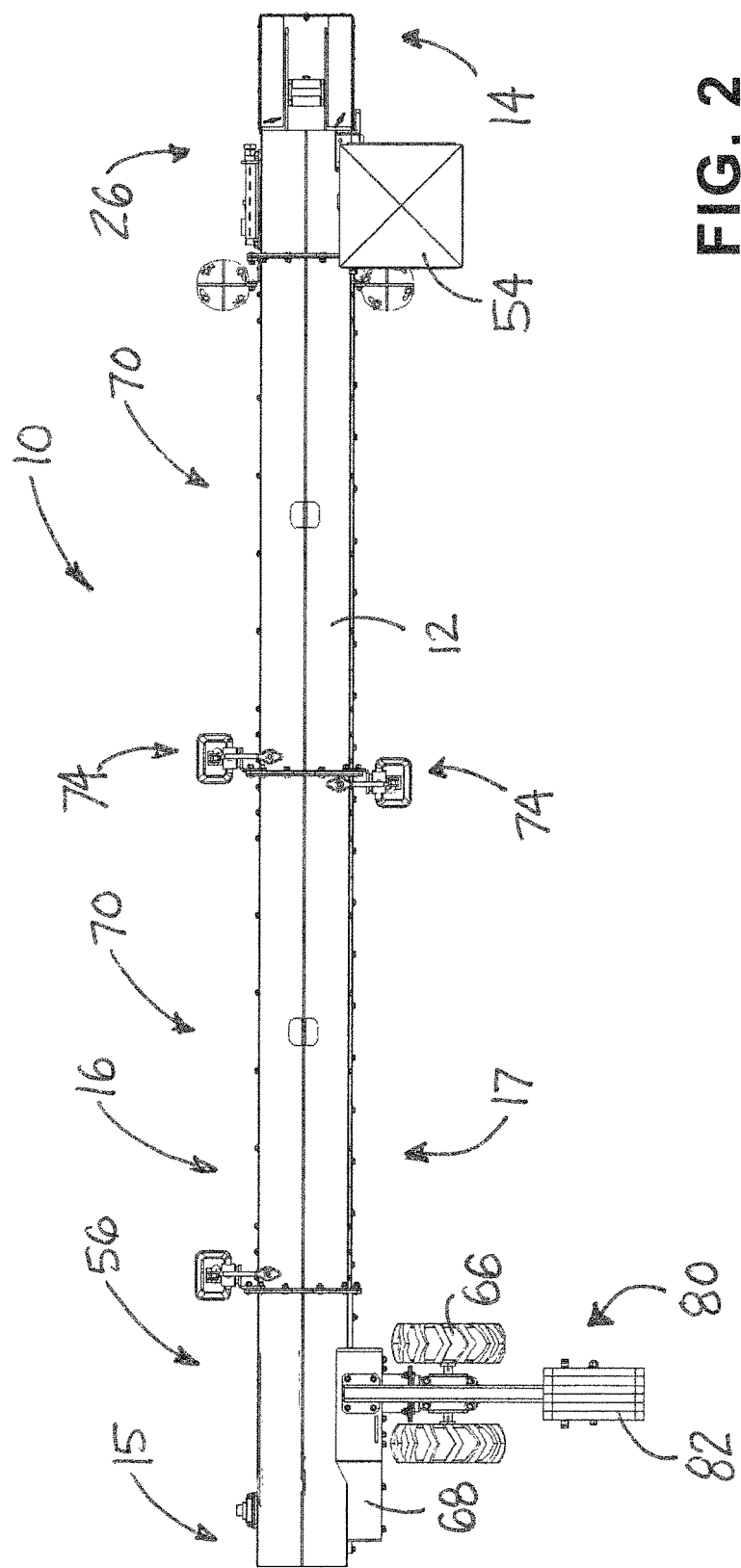
FIG. 2 is a schematic top view of the bin sweep system, according to an illustrative embodiment.
Figure 3:
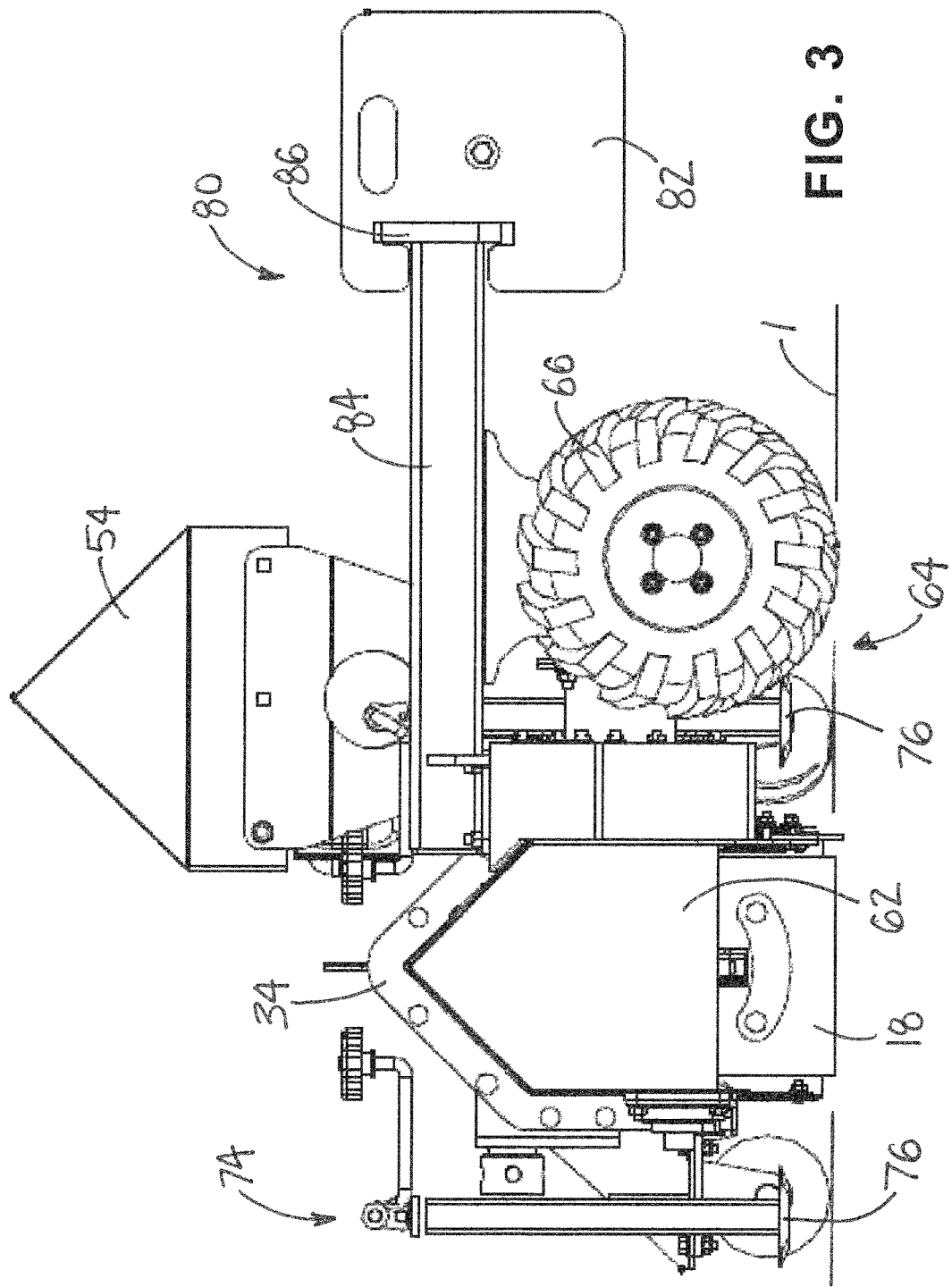
FIG. 3 is a schematic end view of the bin sweep system from the perspective of the outboard drive end of the system, according to an illustrative embodiment.
Figure 4:
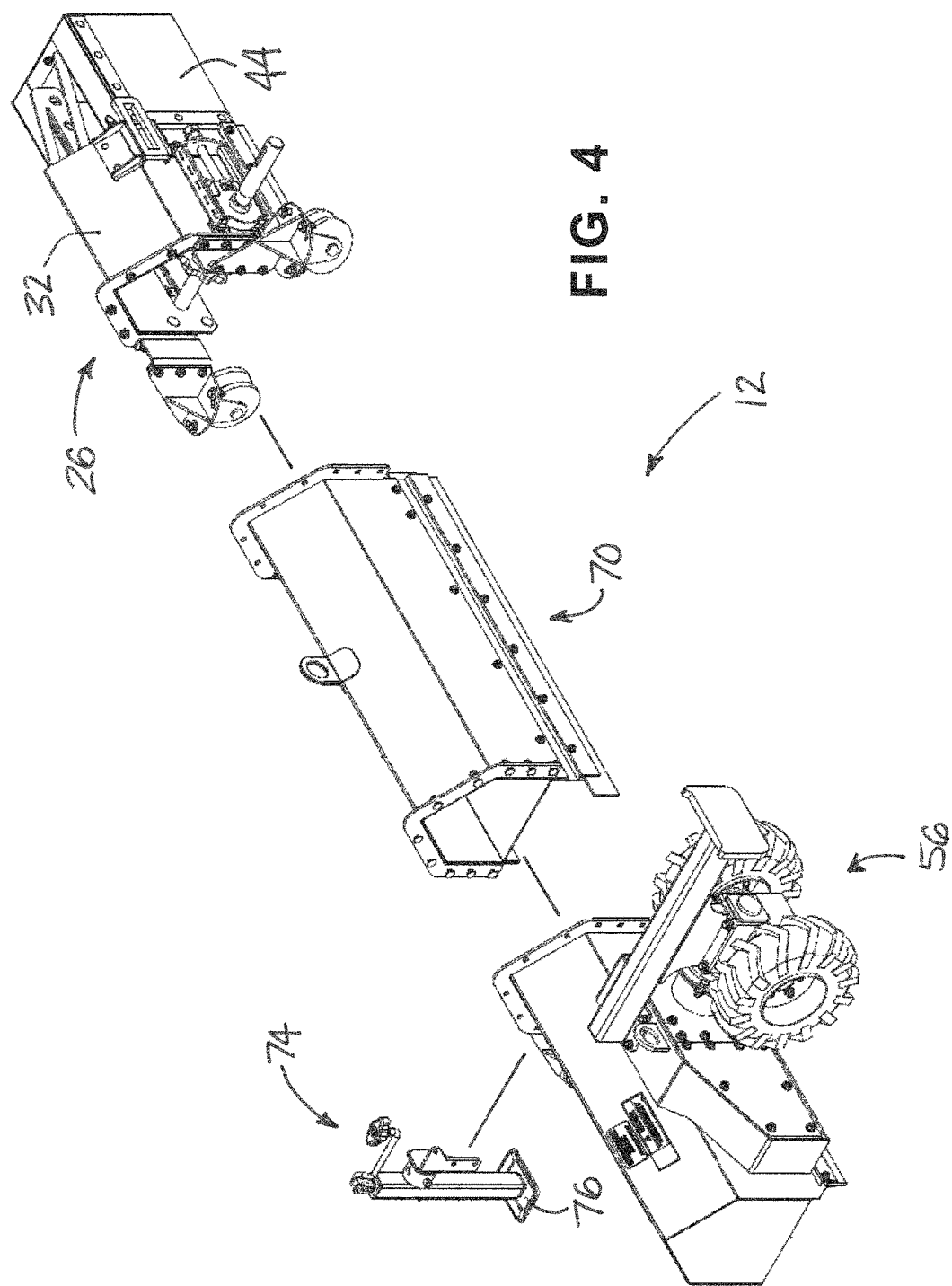
FIG. 4 is a schematic exploded perspective view of an embodiment of the bin sweep system, according to an illustrative embodiment.
Figure 5:
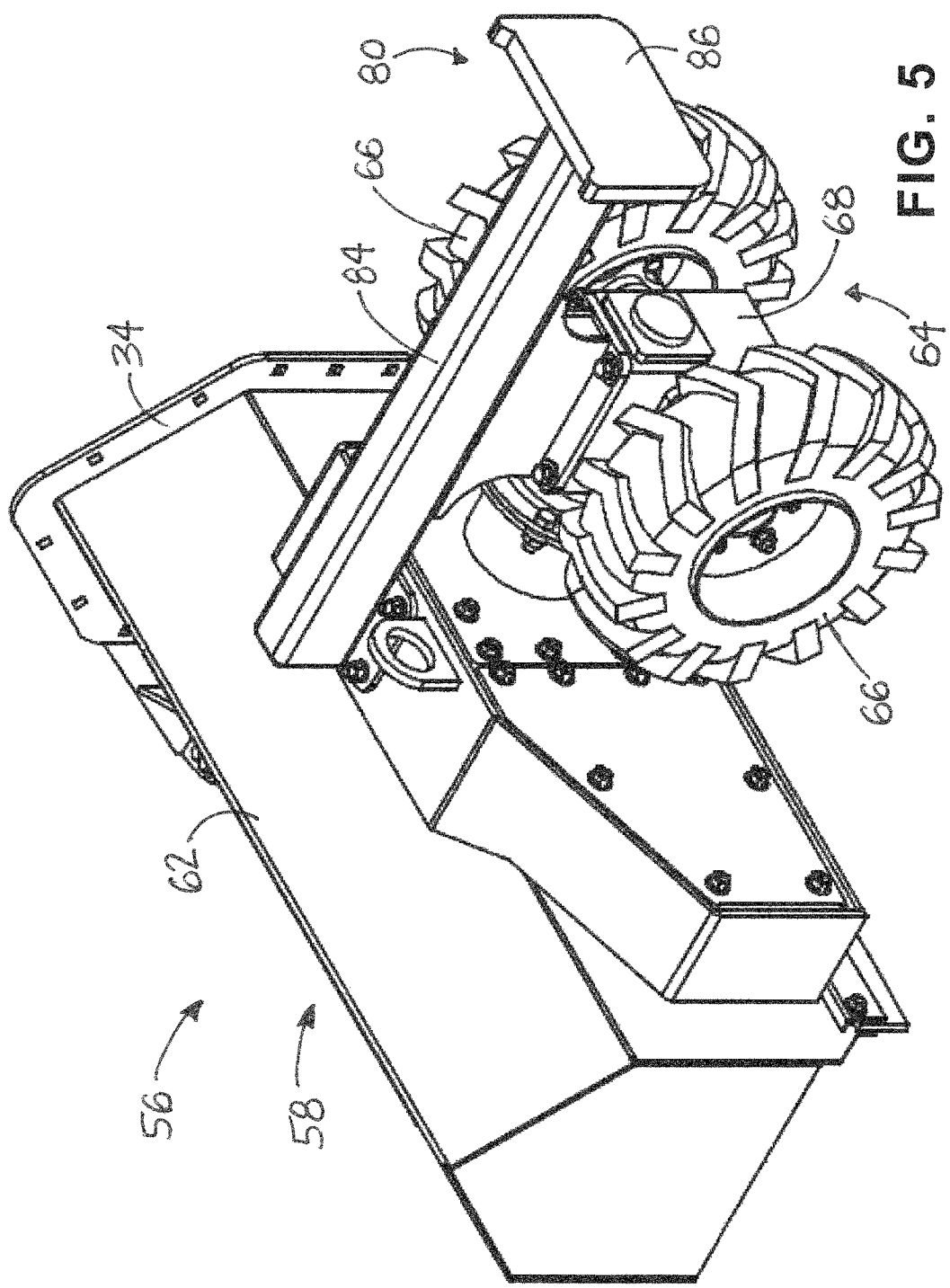
FIG. 5 is a schematic perspective view of the drive unit of the bin sweep system, according to an illustrative embodiment, shown isolated from other elements of the system.
Figure 6:
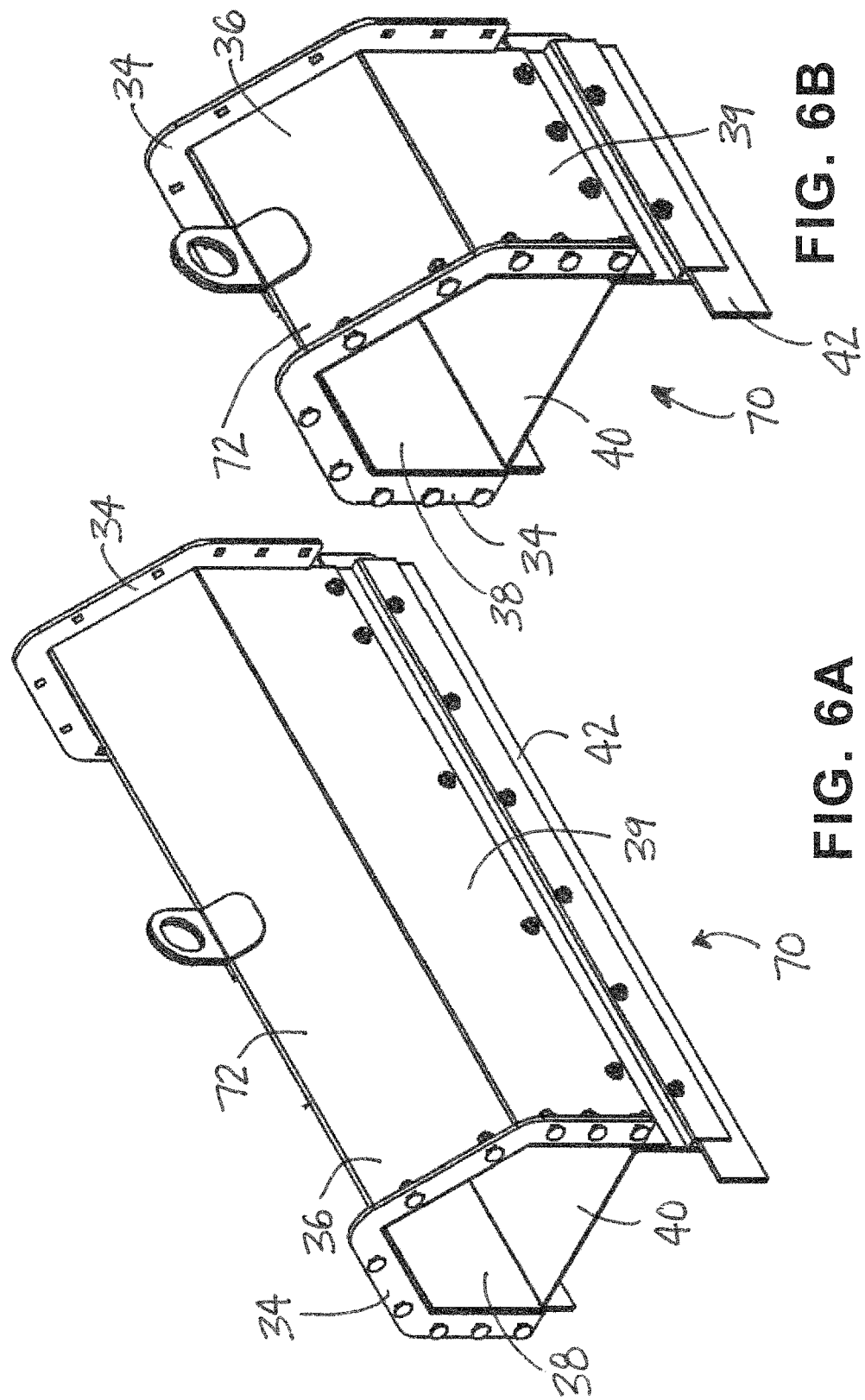
FIG. 6A is a schematic perspective view of one embodiment of the linking unit of the bin sweep system, according to an illustrative embodiment, shown isolated from other elements of the system.
FIG. 6B is a schematic perspective view of one embodiment of the linking unit of the bin sweep system, according to an illustrative embodiment, and shown isolated from other elements of the system.
Figure 7:
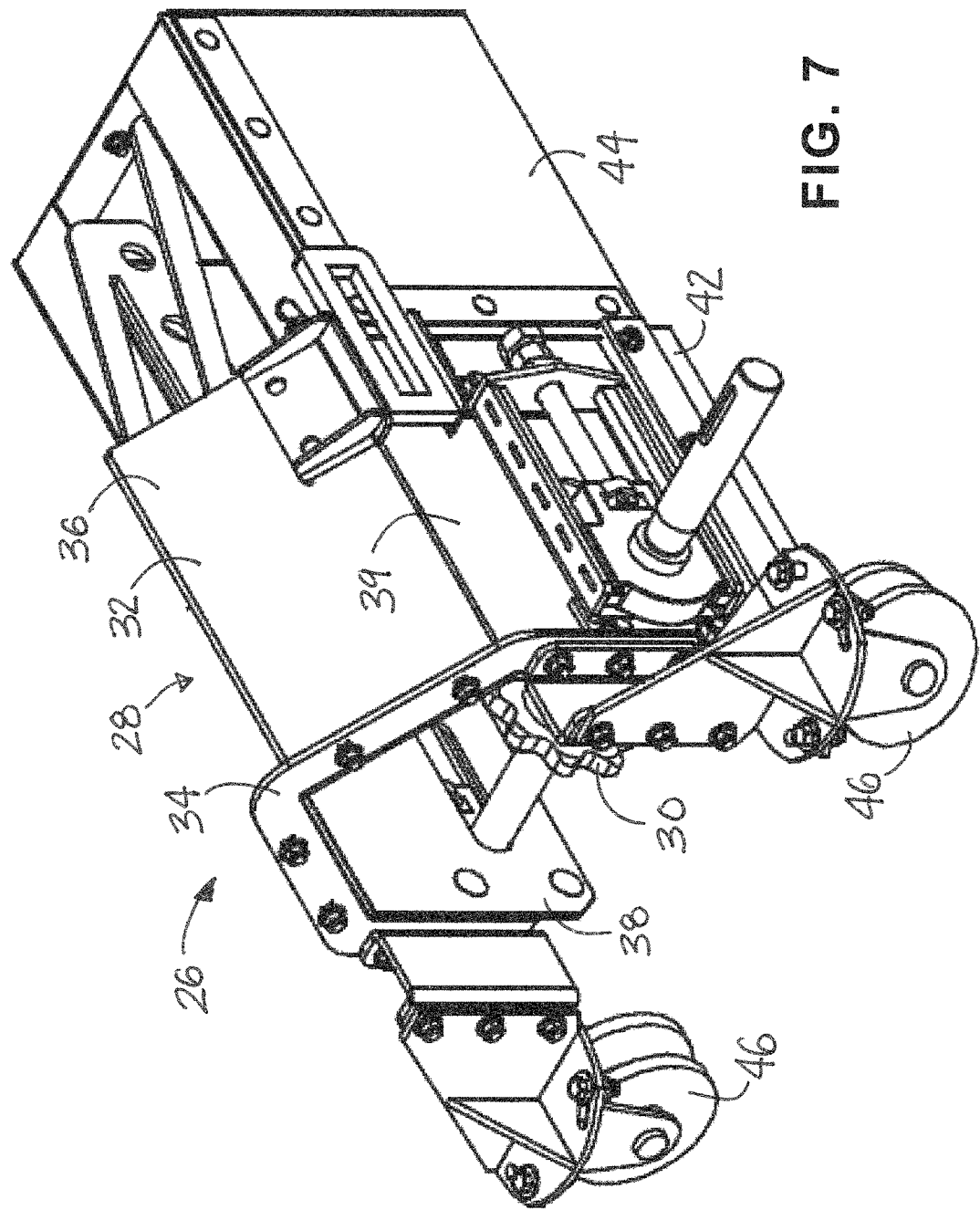
FIG. 7 is a schematic perspective view of first base portion of the power unit of the bin sweep system with the motor portion removed, according to an illustrative embodiment, and shown isolated from other elements of the system.
Figure 8:
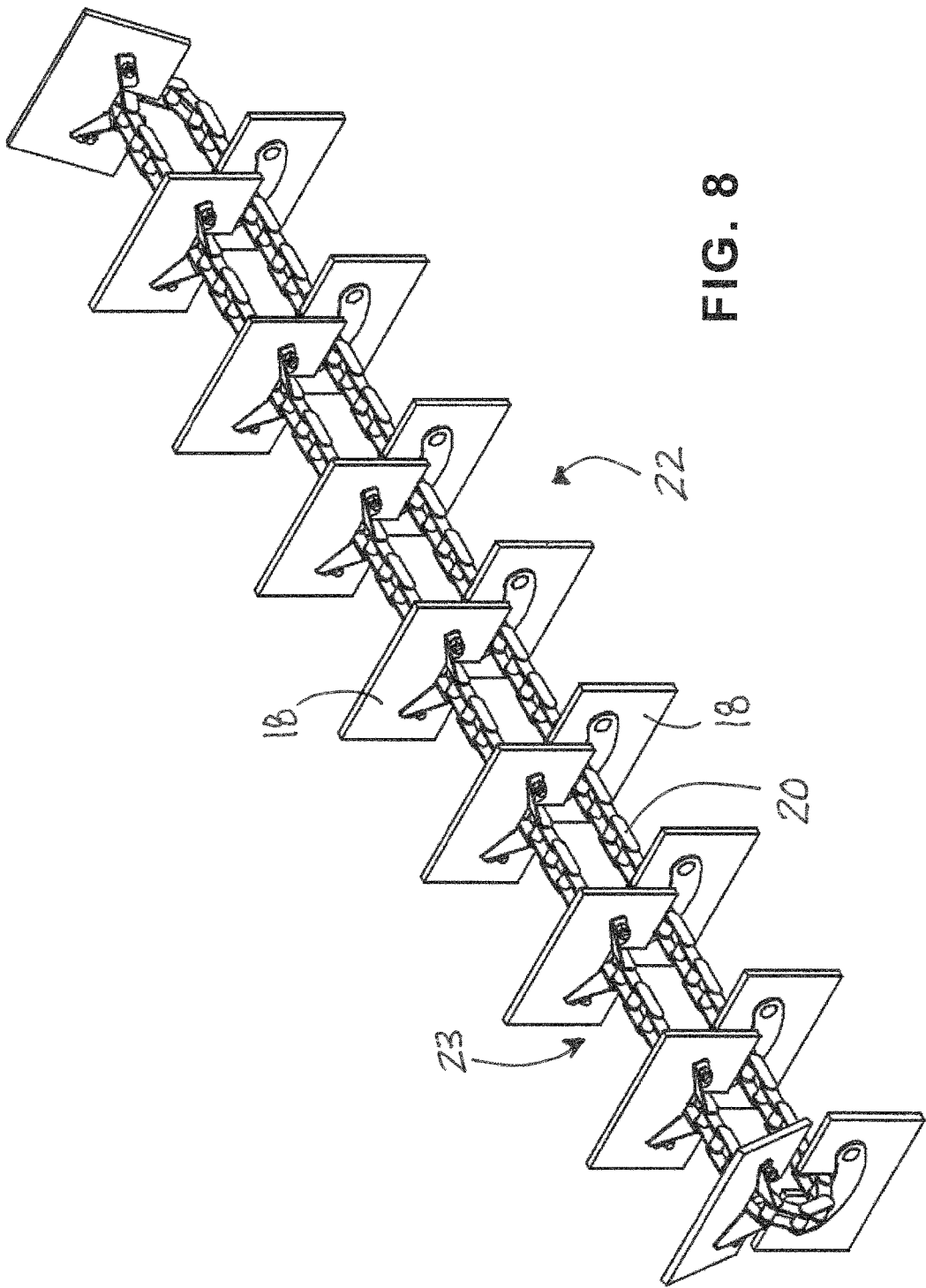
FIG. 8 is a schematic perspective view of the succession of paddles, including the paddles and the endless loop member of the bin sweep system, according to an illustrative embodiment, and shown isolated from other elements of the system.
Figure 9:
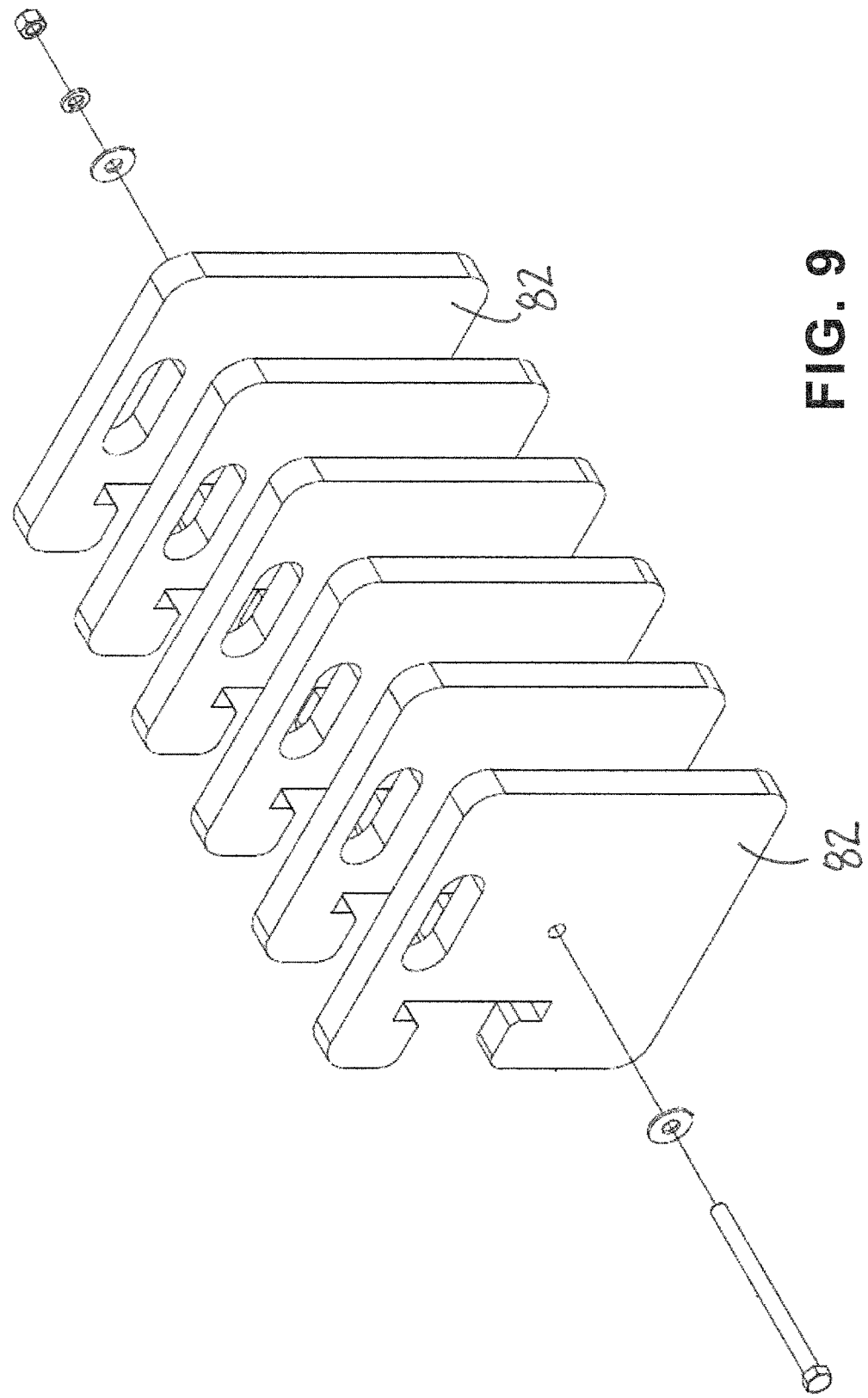
FIG. 9 is a schematic exploded perspective view of the weight elements of the traction enhancement structure of the bin sweep system, according to an illustrative embodiment, and shown removed from other elements of the system.
Figure 10:
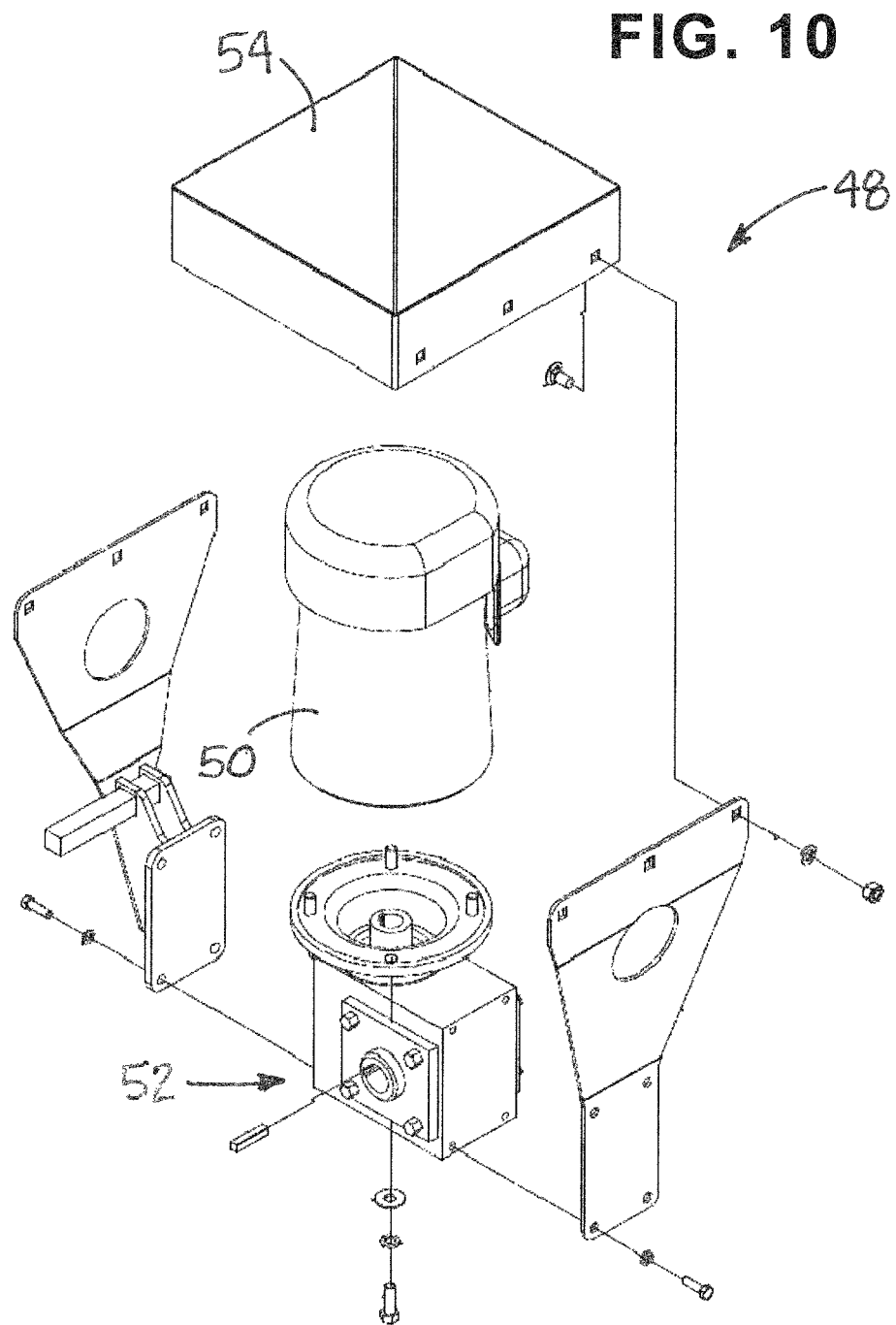
FIG. 10 is a schematic exploded perspective view of the motor portion of the power unit of the bin sweep system, according to an illustrative embodiment, and shown isolated from other elements of the system.
Figure 11:
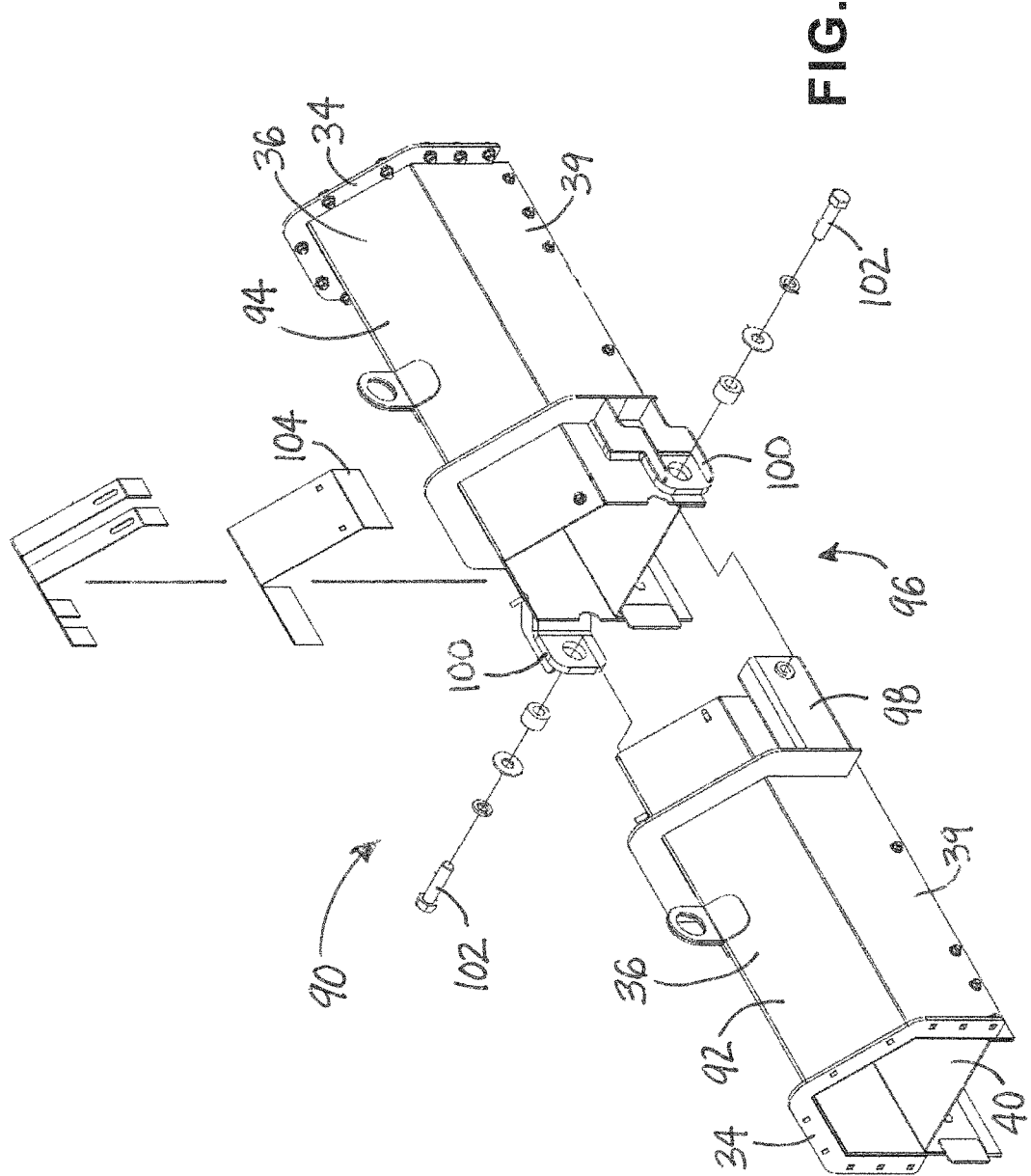
FIG. 11 is a schematic exploded perspective view of the pivot unit of the bin sweep system, according to an illustrative embodiment, and shown isolated from other elements of the system.
Figure 12:
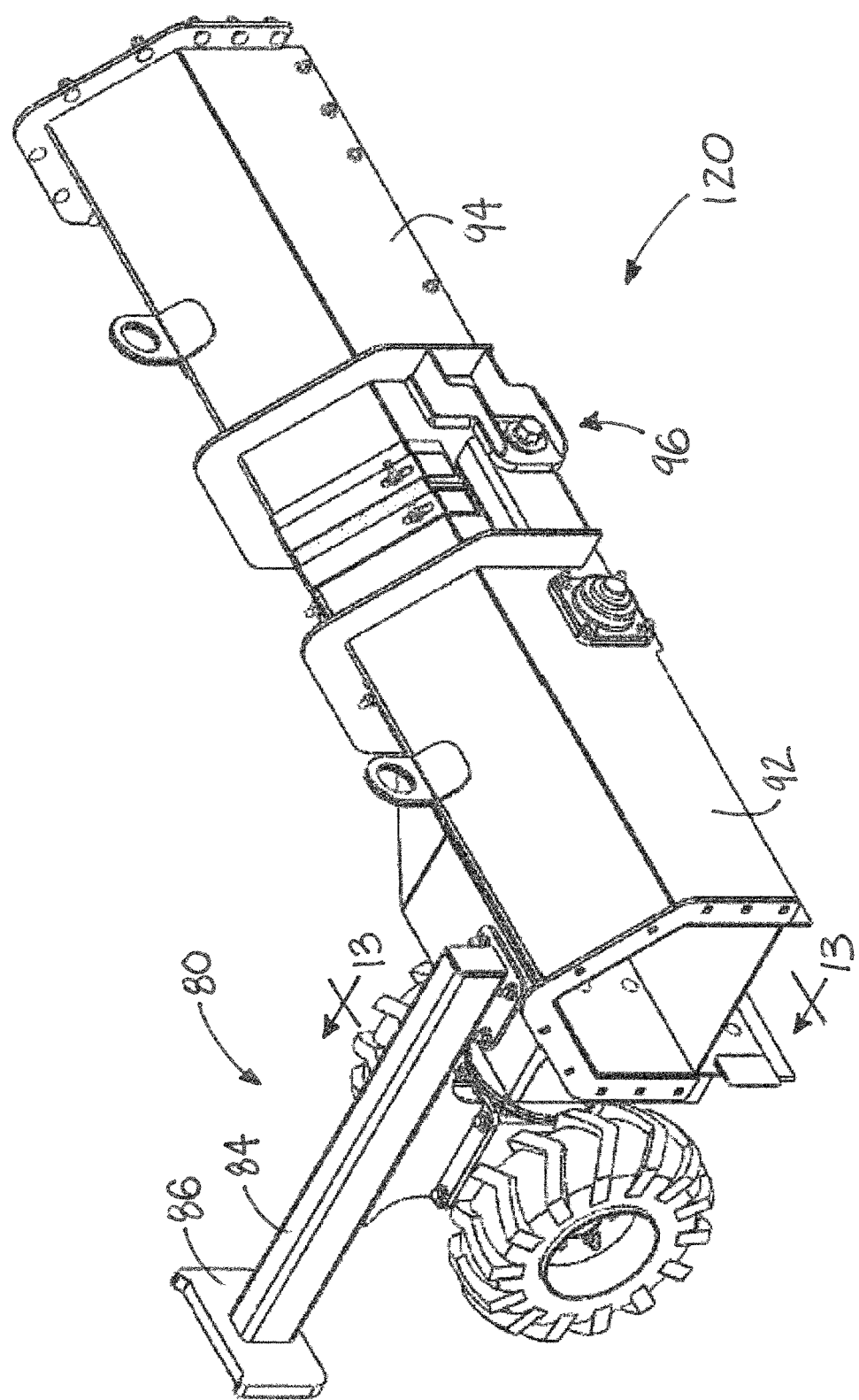
FIG. 12 is a schematic perspective view of an embodiment of a combination pivot and power unit of the bin sweep system. shown isolated from other elements of the system.
Figure 13:
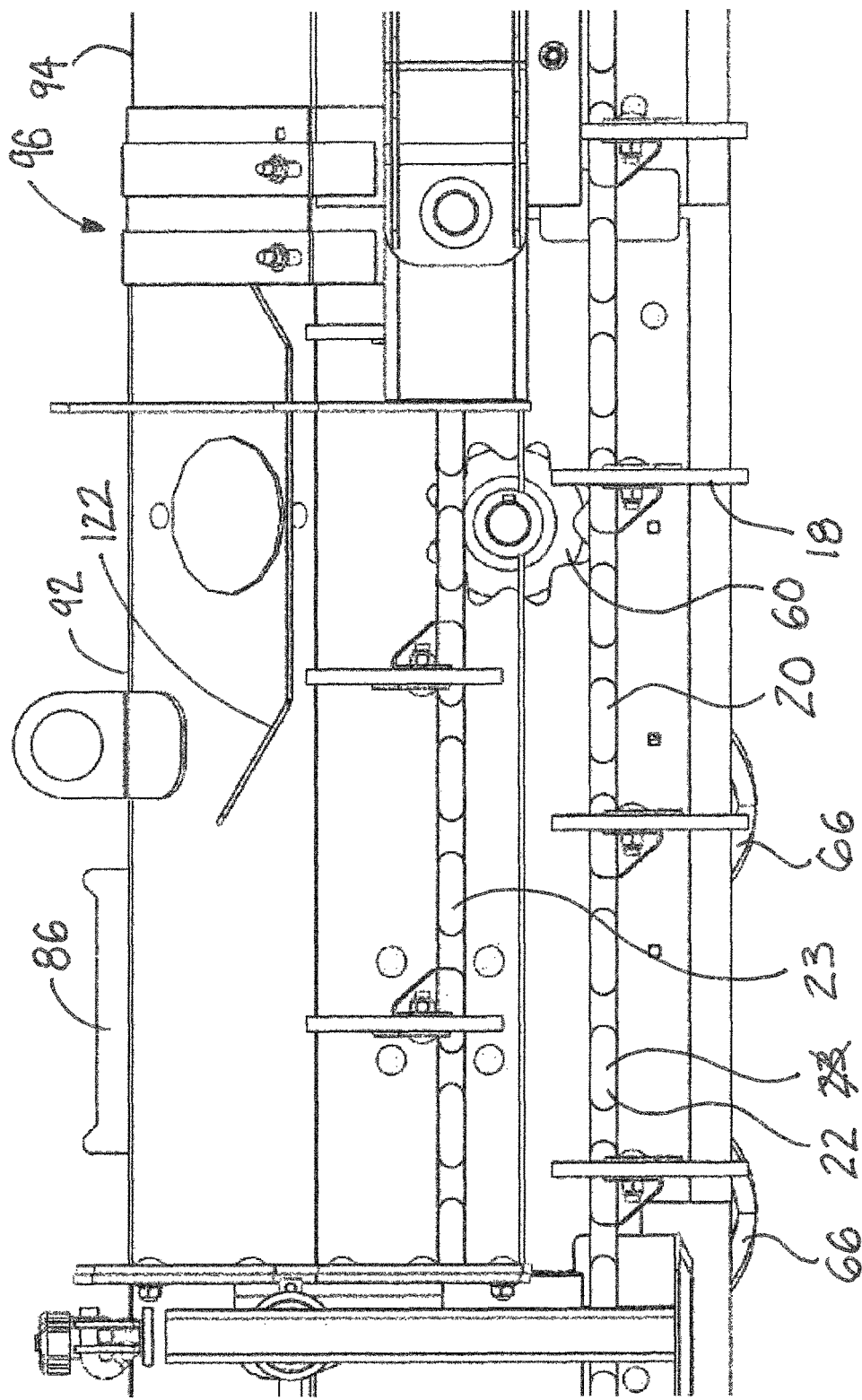
FIG. 13 is a schematic side sectional view of the embodiment of the combination pivot and power unit in FIG. 13 taken along line 13-13 in FIG. 12.

With reference now to the drawings, and in particular to FIGS. 1 through 23 thereof, a new modular storage bin sweep system embodying the principles and concepts of the disclosed subject matter will be described.

The disclosure relates in one aspect to a modular storage bin sweep system 10 that utilizes paddles to sweep and move particulate matter across a floor surface 1 of a bin. The system 10 is highly suitable for use with particulate food crops such as grains, but is not limited to use with grains and may be used for other food stuffs, as well as other non-food stuffs that involve particles of a size less than approximately 1 inch (approximately 2.5 cm). The illustrative embodiments of the system 10 discussed in this disclosure relate to round storage bins, and while the system is highly suitable for use in round storage bins, those skilled in the art will recognize that the usefulness of the system is not limited to only round storage bins.

In the illustrative embodiments disclosed herein, the system 10 includes a sweep assembly 12 that comprises at least two units 26, 56 which may be arranged in a linear array, and typically the linear array will be sized to extend from a central area of the bin interior, where a sump or other receptacle for the particulate matter is located, to a peripheral area of the bin interior along the circumference of the interior located just inside of the perimeter wall forming the bin. The sweep assembly 12 may thus have an inboard end 14 for locating toward to the central area of the bin interior and an outboard end 15 for locating toward the peripheral area of the bin interior. The inboard end 14 may be positioned over the sump in the floor of the bin for receiving the particles moved by the system toward the central area of the bin interior.

The sweep assembly 12 may include two units, but often includes more than two units in the linear array. The number of units in the array of the sweep assembly may typically be a function of the distance between the central area and the peripheral area of the bin interior so that the length of the sweep assembly generally approximates the distance between the areas (which in the case of a round bin is approximately the radius of the bin interior). The units may have different lengths that may be utilized in the linear array of units to achieve substantial correspondence between the length of the sweep assembly and the radius of the bin. The units may be connected together to form the sweep assembly, and the units may be connected together that permits disconnection of the connected units, although this is not critical. The sweep assembly 12 may have a forward side 16 oriented toward the direction of movement of the assembly 12 and a rearward side 17 oriented away from the direction of movement.

The sweep assembly 12 may also include a plurality of interconnected paddles 18 that are movable in a series or succession on a path that generally extends along at least a portion of the length of the sweep assembly between the inboard 14 and outboard 15 ends. The plurality of paddles 18 may be arrayed along a line extending between the inboard 14 and outboard 15 ends of the sweep assembly. In many embodiments, the plurality of paddles 18 are mounted on an endless loop member 20, and may be located at spaced locations along the endless loop. The endless loop member 20 may comprise a series of interconnected links, and may comprise a plurality of chain links, although other configurations may be utilized. The endless loop generally has a lower stretch 22 on which the attached paddles are oriented in a downward direction, and an upper stretch 23 on which the attached paddles extending upwardly in an inverted direction. Generally, the lower stretch, and the paddles mounted thereon, move toward the inboard end and the upper stretch with the associated paddles move toward the outboard end.

In general, the sweep assembly 12 may include a power unit 26, a drive unit 56, and a linking unit 70. The sweep assembly 12 may often include more than one of each of these units, in particular the linking unit, as will become apparent from the following description of each of these units.

In greater detail, the power unit 26 is configured to move the plurality of paddles 18 along the sweep assembly. Typically, the power unit 26 is positioned toward the inboard end 14 of the sweep assembly, and usually the power unit is positioned at the inboard end. The power unit 26 may comprise a first base portion 28 which carries a portion of the succession of interconnected paddles 18. The first base portion 28 may include a rotatable drive member 30 on which a portion of the endless loop member 20 is engaged. In embodiments, where the endless loop member 20 comprises a chain, the rotatable drive member may be a toothed sprocket. In the most preferred embodiments, the position of the rotatable drive member may be adjustable to thereby adjust a degree of tension in the endless loop member supporting the succession of paddles. In other embodiments, the tension on the loop member may be adjustable by structure positioned at other locations of the sweep assembly, such as at or near the outboard end 15 of the sweep assembly.

The first base portion 28 may also comprise a first housing segment 32 that defines an interior in which a portion of the plurality of interconnected paddles is positioned. The rotatable drive member 30 may be positioned in the interior of the first housing segment 32. The first housing segment 32 may have a connecting flange 34 configured to connect the first housing segment to another housing segment. The housing segment may have a pitched roof wall 36, and may have at least one side wall 38 that extends downwardly from the roof wall 36. The housing segment may include a pair of the side walls 38, 39 that are laterally spaced. An intermediate wall 40 may extend between the side walls 38, 39 to create an upper space in the housing segment, and in some embodiments, the upper stretch 23 of the endless loop member may be positioned in the upper space such that the inverted paddles travel through the upper space as the paddles return from the inboard end to the outboard end of the sweep assembly. A drag member 42 mounted on one of the side walls and extending downwardly from the side wall toward a surface below the sweep assembly. The drag member may be flexible in character to permit the lower portion of the member 42 to contact and follow the surface of the floor.

Figure 16A:
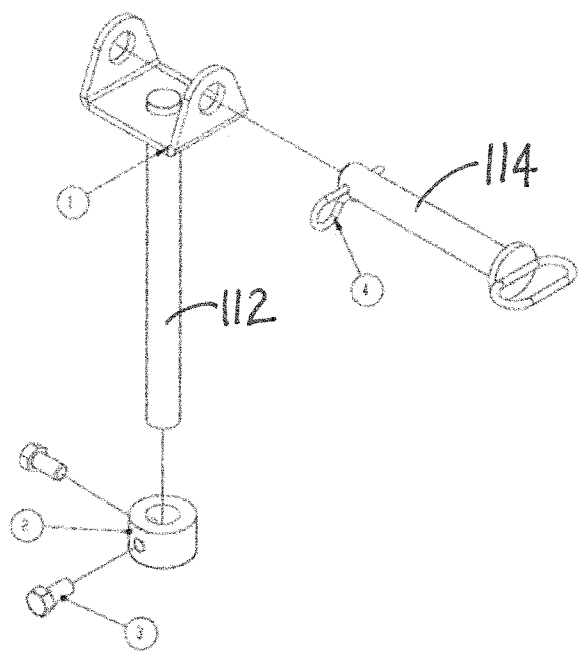
FIG. 16A is a schematic exploded perspective view of one embodiment of a post for connecting the center support of the power unit to a sump structure of the storage bin.
Figure 16B:
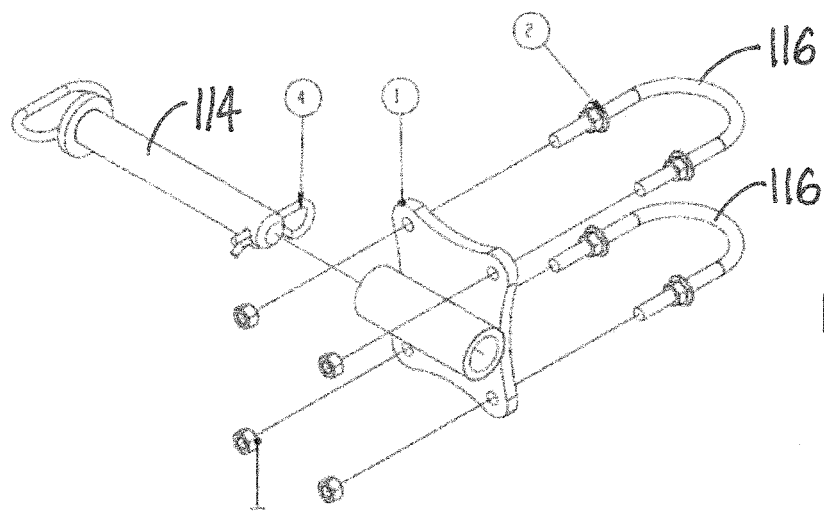
FIG. 16B is a schematic exploded perspective view of one embodiment of a saddle for connecting the center support of the power unit to a sump structure of the storage bin.
Figure 19:
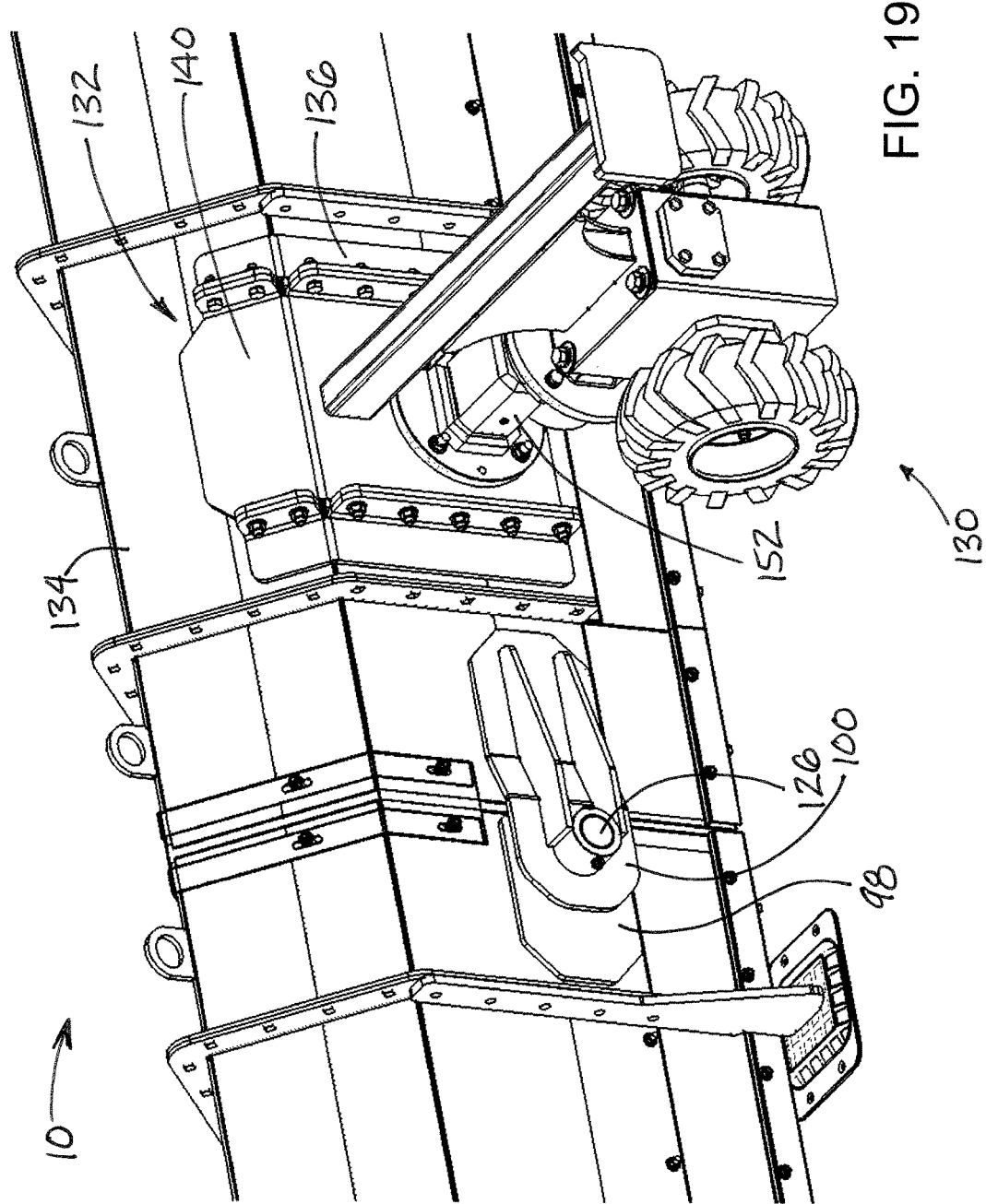
FIG. 19 is a schematic perspective view of a portion of an embodiment of the sweep assembly.
Figure 20:
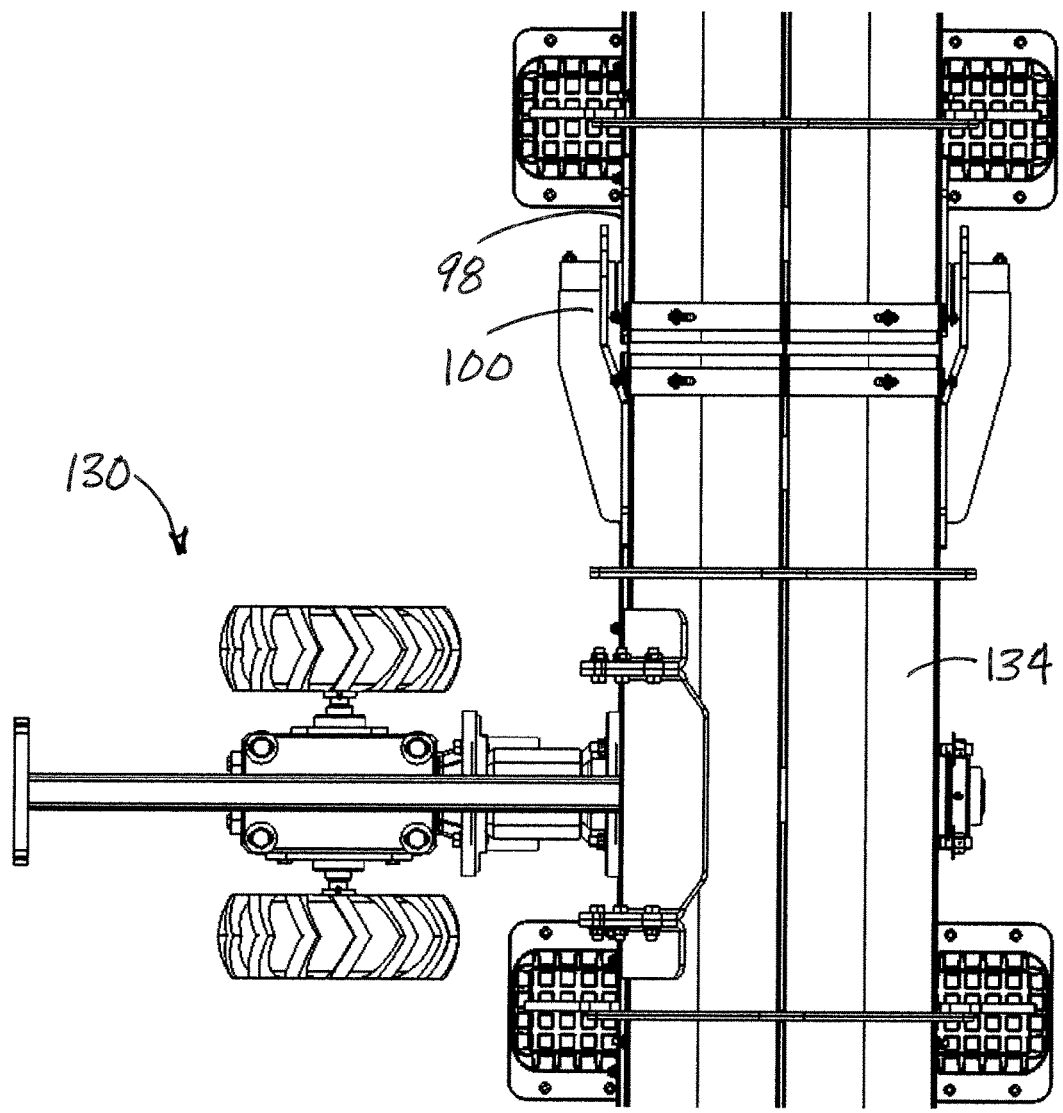
FIG. 20 is a schematic top view of a portion of the embodiment of the sweep assembly shown in FIG. 19.
Figure 21:
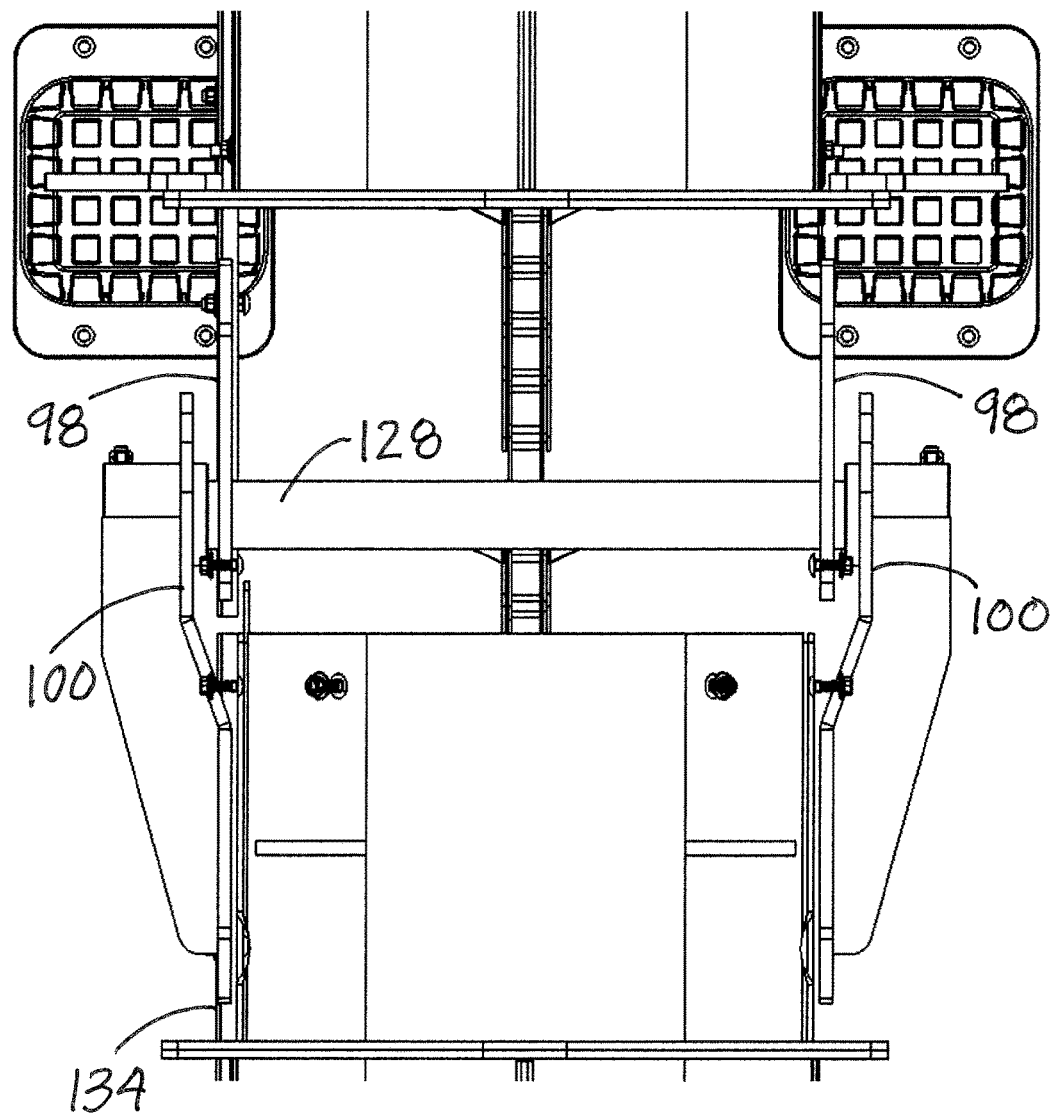
FIG. 21 is a schematic top view of a portion of the sweep assembly shown in FIG. 19 with elements removed to show details of the interior of the assembly.
Figure 22:
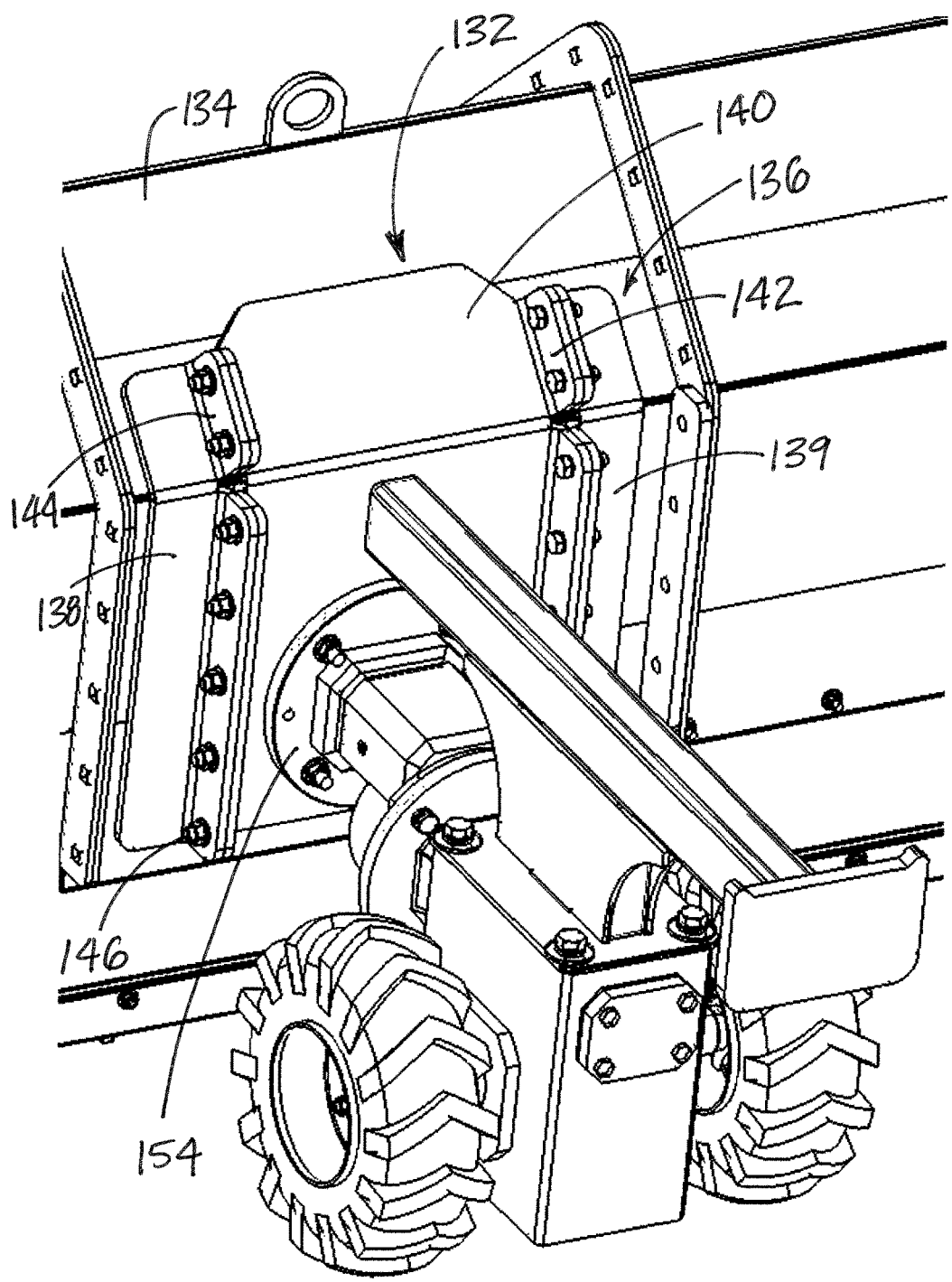
FIG. 22 is a schematic enlarged perspective view of a portion of the embodiment of the sweep assembly shown in FIG. 19.
Figure 23:
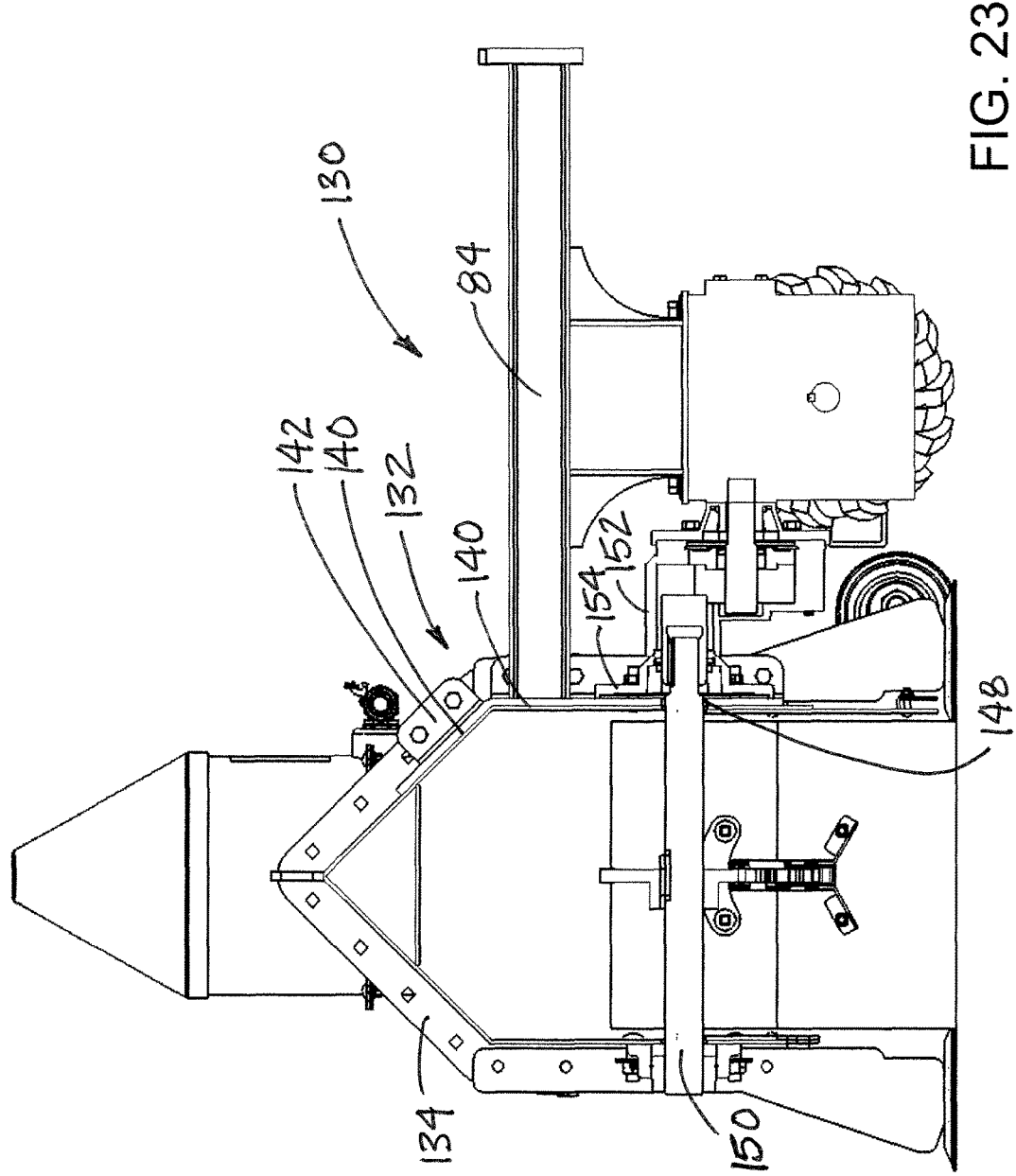
FIG. 23 is a schematic end sectional view of the embodiment of the sweep assembly shown in FIG. 19.

The first base portion 28 may also include a center support 44 that extends from one end of the first housing segment 32 and that is configured to engage the sump (or a structure associated with the sump) to hold the center support 44 at the sump and cause the sweep assembly to rotate about the sump as it moves forwardly. In some embodiments, such as shown in FIG. 15, the center support 44 includes a cantilevered arm 110 that extends inwardly from the end of the first housing segment 32 for extending toward and in some cases over the sump. Mounted on the arm 110 is a structure for engaging the sump or the sump structure. For example, as shown in FIG. 15, the structure may include a post 112 that is mounted on the arm 110 and extends downwardly to engage the sump structure. FIG. 16A shows one variation of the post 112. The post 112 may be mounted on the arm 110 by a pin 114 that permits some degree of movement by the post. In other embodiments, the structure at the sump of the bin may incorporate or include an upright post, and in such installations, a saddle structure 116 may be employed to engage the upright post with a pin that mounts on the arm 110 (see for example FIG. 16B).

At least one support wheel 46 may be included on the first base portion 28 and may be mounted on the first housing segment 32 to contact the surface below the sweep assembly. In some embodiments, a pair of support wheels is utilized, with one wheel being located on the forward and rearward sides of the sweep assembly. Optionally, each of the support wheels may be adjustable in orientation to change the horizontal axis about which the support wheel rotates. Further, as is shown illustratively in FIG. 15, the support wheel on the rearward side may be spaced away from the first housing segment 32 a greater distance than the support wheel on the forward side of the weep assembly to counter the effect of the weight of the motor portion 48 on the balance of the power unit.

The power unit 26 may further comprise a motor portion 48 that is connected to the first base portion 28, and more specifically may be mounted on the first housing segment 32. The motor portion 48 may comprise a motor 50 connected to the rotatable drive member 30 to rotate the member, and a gearset 52 that connects the motor to the rotatable drive member to transfer rotational motion from the motor to the rotatable drive member. The motor portion 48 may also comprise a hood 54 that encloses the motor and the gearset for protection of these components.

The drive unit 56 is generally configured to move the sweep assembly 12 with respect to the surface 1 below the sweep assembly, and may be positioned toward the outboard end 15 of the sweep assembly. In many embodiments, the drive unit 56 is positioned at the outboard end 15 of the sweep assembly, and in sweep assemblies of significant length may include multiple drive units, with additional drive units being interspersed between linking units 70 of the sweep assembly at location between the inboard and outboard ends.

In greater detail, the drive unit 56 may comprise a second base portion 58 which may be similar in some aspects to the first base portion 28. The second base portion 58 may include a rotatable driven member 60 on which a portion of the endless loop member 20 is engaged or entrained, and in cases where the loop member comprises a chain of links, the rotatable driven member may be a sprocket. The second base portion 58 may also comprise a second housing segment that defines an interior in which a portion of the endless loop member 20, and the paddles mounted thereon, may be positioned. The second housing segment 62 may also be provided with a connecting flange 34 to connect the second housing segment 62 to other housing segments, and thus the connecting flanges of the various housing segments may be similarly configured in size and shape and with holes for receiving connecting fasteners. The second housing segment 62 may also include a pitched roof wall 36, a pair of side walls 38, 39, and an intermediate wall 40 that are generally configured similarly to the same elements of other housing segments.

The drive unit 56 may have a surface engaging portion 64 that is configured to engage the surface below the sweep assembly 12 and move the sweep assembly with respect to the surface. The surface engaging portion 64 may be engaged with and connected to the succession of paddles (such as the endless loop member 20) in a manner that drives elements of the surface engaging portion to move the sweep assembly. The surface engaging portion 64 may be mounted on the second housing segment 62 of the second base portion.

The surface engaging portion 64 may include at least one surface engaging wheel 66, and preferably may include a pair of wheels, that rest upon the surface below the sweep assembly. The wheels may be rotatable about a substantially horizontal axis, and an axis that is oriented substantially parallel to the axis of the succession of paddles. The wheels may be suitably configured to operate in and on a particular material a well as on a hard surface, including suitable lugs and foam filled interiors. It will be appreciated by those skilled in the art that, while some of the most preferred embodiments of the system 10 utilize wheels for the surface engaging portion, other means may less preferably be utilized, such as tracks, rollers, articulating legs, etc.

The surface engaging portion 64 may also include a drive train 68 that is configured to transmit power from the succession of paddles (such as the endless loop member) to the wheel or wheels 66. The drive train 68 may include, for example gears and chain/sprockets, to transmit power from the succession of paddles to the wheels, and may include a combination of gears and chain/sprockets. In some of the most preferred embodiments, the chain/sprocket portion of the drive train 68 permits the sprockets to be interchanged or swapped out so the speed at which the wheels are driven may be adjusted. as illustratively shown in FIG. 13, the rotatable driven member is connected (e.g., by a shaft) to a drive chain sprocket 110, which is connected by a chain 112 to a driven chain sprocket 114, which in turn may be connected to gears 116 that drive the wheels 66 through an axle. The drive chain sprocket 110 and the driven chain sprocket 114 may be interchanged with sprockets having different teeth counts to adjust the speed that the driven chain sprocket turns with respect to the drive chain sprocket.

Significantly, the ability to adjust the speed of rotation transmitted to the wheels allows the paddles to move at generally the same speed in different lengths of sweep assemblies, while allowing the speed of the wheel rotation to be tailored to the specific length of the sweep assembly. Thus, the wheels of longer length sweep assemblies may be driven at a faster speed than the wheels of relatively shorter length sweep assemblies, which can reduce tire wear as well as the general stress that might be imposed on the system 10 components by wheels that are turning faster than an optimal speed.

The linking unit 70 may be configured to link other units together, including power unit(s), drive unit(s) and other linking unit(s). The linking unit 70 may comprise a third housing segment 72 that may be similar in form to the other housing segments, including the pitched roof wall 36, side walls 38, 39 and the intermediate wall 40. Further, the third housing segment may have a connecting flange 34 located on each of the opposite ends of the linking unit to permit connection of both ends of the linking unit to the connecting flanges of other units. The length of the linking units between the ends may have various sizes to permit the length of the sweep assembly to be adjusted by including linking units of different lengths in the linear array of units of the assembly 12. In some of the most preferred embodiments of the system 10, the power unit(s) and drive unit(s) will have approximately the same length, while the linking units may have different lengths. For example, linking units with lengths of approximately 1 foot (approximately 30 cm), approximately 3 feet (approximately 60 cm), and approximately 5 feet (approximately 90 cm) provide a wide variety of lengths through different combinations of these lengths, while minimizing the number of units employed.

The system 10 may also include at least one auxiliary support apparatus 74 that is configured to provide additional support to the sweep assembly 12. The auxiliary support apparatus 74 may have a lower end 76 for contacting the surface below the sweep assembly. The auxiliary support apparatus may be mounted on one of the units of the sweep assembly, and the position of the lower end 76 may be adjustable with respect to the unit on which it is mounted such that the extent to which the lower end protrudes downwardly from the unit is adjustable. The auxiliary support apparatus, and in most embodiments more than one of the apparatus 76, may be located at various locations between the inboard and outboard ends of the sweep assembly to provide support for the units, since the power unit and drive unit(s) engage the surface below the sweep assembly but the linking units do not (other than any apparatus 74 attached to that linking unit). The auxiliary support apparatus 74 may be mounted on the forward and rearward sides of the sweep assembly. In some embodiments, the auxiliary support apparatus 74 may comprise a trailer tongue jack with a handle that may be used to adjust the position of a foot on the lower end of the jack to set the proper position for support. The degree of support provided by each of the support apparatus 74 may thus be individually set to provide support while allowing the foot to slide over the surface 1.

In one significant aspect, the system 10 may include a traction enhancement structure 80 that is configured to increase the traction or tractability of the drive unit 56 on the surface 1 below the sweep assembly, or the particulate material if the wheels of the unit are situated on a pile of the particulate. The traction enhancement structure 80 may enhance the tractability of the drive unit by applying additional weight to the sweep assembly at the location of the drive unit to provide additional down force on the wheels. The traction enhancement structure 80 may provide an adjustable degree of traction enhancement or down force, such as by permitting the adding of a variable amount of weight to the drive unit. The traction enhancement structure 80 may be mounted on the rearward side of the sweep assembly, and may be positioned adjacent to the surface engaging portion. In some preferred embodiments, the traction enhancing structure 80 may be positioned above and over the wheels of the surface engaging portion, although this is not critical.

Illustratively, the traction enhancement structure 80 may comprise at least one weight element 82, and a weight support 84 that is configured to support at least one, and preferably multiple, weight elements 82. The weight support 84 may be elongated to support a plurality of the weight elements thereon. The weight support 84 may extend from the second base portion 58 of the drive unit 56, and may extend over the wheels 66 of the surface engaging portion. The weight support 84 may also be mounted or linked directly to the surface engaging portion. In some embodiments, the weight support 84 may extend beyond the wheels 66 such that the weight of the weights 82 positioned at the end of the support 84 is enhanced by the longer lever arm. The weight support 84 may have a free end with a mounting plate 86 that is positioned at the free end to engage portions of the weights, such as recesses cut into the edges of the weights, although other means of mounting may be utilized. The weights may be fastened together to be supported on the mounting plate 86 as a unit.

Significantly, the traction enhancement structure 80 permits the parts of the sweep assembly to be moved into place in the bin interior in a relatively lightweight configuration, and the additional weight may be added to the drive unit as needed and to the degree needed. In contrast, simply making the drive unit heavier by a predetermined amount may add excess weight that would unnecessarily strain the system and consume additional power to operate the system.

Another significant feature of the system 10 that may be included in the sweep assembly 12 allows a degree of flexibility or pivotability in the linear array of units in the sweep assembly 12. The flexibility may be useful for situations where the ability for some sections of the sweep assembly to move vertically in a somewhat independent manner from other sections is desirable. This flexibility may be desirable where, for example, the sweep assembly is to operate on surfaces 1 that are uneven in contour and in installations where the sweep assembly is relatively long.

In greater detail, a pivot unit 90 (see FIG. 11) may have a pair of connected sections 92, 94 that are able to move with respect to each other, and may be able to pivot about a substantially horizontal axis with respect to each other. The sections 92, 94 are connected at adjacent ends by a pivot structure 96 that connects the section in a manner that permits the relative movement in a relatively free manner within a limited degree of movement. The pivot structure 96 may comprise one or more pivot arms 98 that extend from one 92 of the connected sections to mount on pivot tabs 100 extending from the other 94 of the connected sections. The pivot arms 98 and pivot tabs 100 may be pivotally fastened together, such as by pivot pins 102. The pivot pins 102 may extend along a substantially horizontal axis to permit pivoting about the horizontal axis and in a vertical plane, but may be configured in a manner that prevents pivoting of the sections about a vertical axis with respect to each other. The housings of the connected sections 92, 94 may be further linked by a flexible cover 104 that provides some degree of resistance of material from entering the interiors of the housings of the sections. Similar to the linking units, the opposite ends of the connected sections 92, 94 may have connecting flanges that permit connection of the pivot unit to other units of the sweep assembly.

In some embodiments with optional features, such as shown in FIGS. 19 through 23, the pivot structure may be formed with a pivot shaft 126 that may extend across the housing segment of the unit from the pivot arm 98 and the pivot tab 10 on one lateral side of the housing segment to the pivot arm and pivot tab on the other lateral side of the housing segment. The arms and tabs on the sides of the housing segment may thus be constrained to pivot about the same shaft and axis, which tends to reduce any deviation of the pivot axis of one arm/tab pair from the other arm/tab pair.

Additionally, a pivot sleeve 128 may be positioned about the pivot shaft 126 and may be positioned between the pivot arm/pivot tab pairs to help maintain the distance between the arm/tab pairs and thereby help maintain the distance between the housing sections located adjacent to the pivot structure and help reduce any tendency for the housing sides to buckle toward each other under heavy loads placed upon the sweep assembly by the weight of the grain pile. The pivot shaft 126 and pivot sleeve 128 extending between the pivot arms/pivot tabs on the sides of the housing may thus advantageously reduce flexure of the sweep assembly along a line radiating outwardly from the inboard end 14 of the assembly and lying in a substantially horizontal plane. Thus, while the pivot structure allows pivoting of the units of the sweep assembly in a substantially vertical plane, bowing of the sweep assembly in a substantially horizontal plane is limited or even prevented. Significantly, while the housing segments of the various units of the assembly are rigidly connected together along the length of the sweep assembly and form the "backbone" of the assembly, this housing backbone is effectively split or severed at each pivot unit, and the pivot structure of the joint forms the primary or sole linkage between the housing sections on either side of the pivot structure. The pivot shaft 126 and pivot sleeve 128 that extend between the sides of the housing help to maintain the rigidity of the sweep assembly even at locations where the housing backbone is discontinuous.

In some embodiments, the pivot unit may be combined or integrated with a drive unit (see FIGS. 12 and 13 and 19 and 20) into a combination unit 120 which may be particularly useful for long sweep assemblies where additional motive power is needed to move the sweep and it is desirable to avoid an overly rigid sweep assembly across the greater length. The combination unit 120 may have a first section 92 and a second section 94 as well as a pivot structure 96 similar to the pivot unit 90 described above. The combination unit 120 may also include elements of the drive unit 56 previously described, such as a surface engaging portion 58 including a wheel 66, or a pair of wheels and a drive train 68. The drive train and the wheels of the combination unit 120 may be driven by the endless loop member 20 carrying the paddles. To keep the endless loop member 20 engaged with the rotatable driven member 60 connected to the drive train, a deflection shield 122 may be mounted in the interior of the housing segment at a location just above the endless loop member and the paddles moving on the loop member, and prevents the paddles and the connected loop member from moving upwardly and out of engagement with the rotatable drive member.

Figure 14:
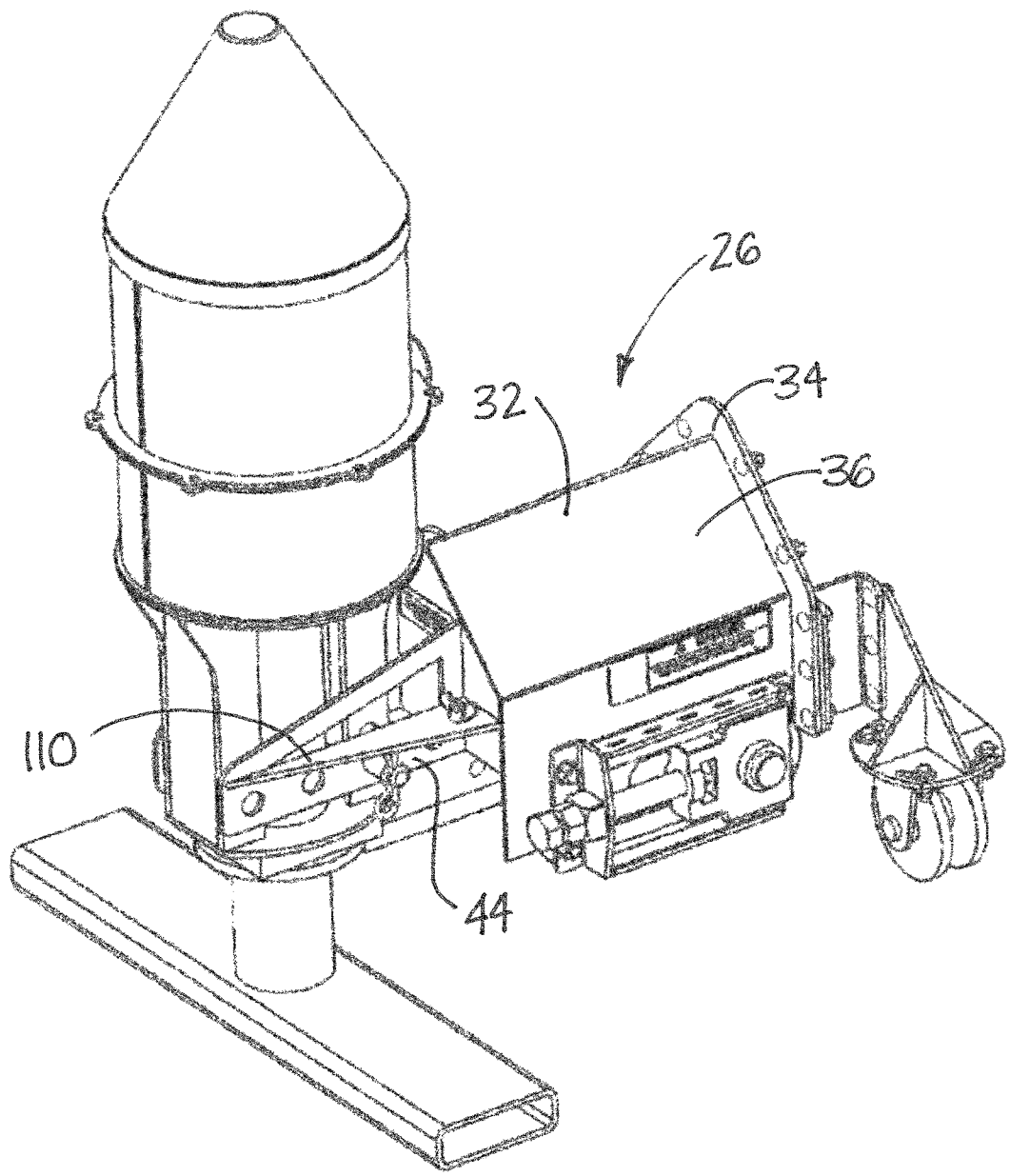
FIG. 14 is a schematic perspective view of a rotary electric contact structure of some embodiments of the bin sweep system.

Looking to FIG. 14 of the drawings, a rotary electric contact structure 124 is shown that may permit a continuous electrical supply path to the motor 50 of the power unit 26 on the moving bin sweep assembly 12 from a stationary power source without the use of a power cord that extends between the bin power source and the sweep assembly. The rotary electric contact structure 124 may employ, for example, one or more annular-shaped electrical contacts that contact each other continuously as the sweep assembly 12 rotates, or may comprise an annular contact and one or more brush structures that remain in contact with each other continuously as the sweep assembly 12 rotates. Other known structures may be employed. The rotary electric contact structure may be mounted on the arm 44 of the power unit 26, and may form a part of the center support.

In optional embodiments such as shown in FIGS. 19 through 23, a drive unit 130 of the sweep assembly may include features that facilitate the removal of various components of the drive unit with, for example, minimal disassembly of other elements of the drive unit, such as portions of the drive train, the surface engaging wheel or wheels, and even portions of the traction enhancement structure. The optional structure may also allow the replacement of the various components of the drive train without having to access the sweep assembly from beneath.

In such embodiments, a drive apparatus may be mounted on the housing segment 134 so as to be removable as a unit from the housing segment, and may be readily coupled or interfaced to the endless loop member 20. The drive apparatus may include a structural interface 132 positioned on the exterior of the housing segment 134 of the drive unit. The structural interface 132 may comprise an interface frame 136 positioned on the housing segment 134, and may be located on the exterior surface of the housing segment. The frame 136 may include a pair of sections 138, 139 that are spaced from each other in a direction that is substantially parallel to the length of the sweep assembly. The structural interface 132 may also include an interface plate 140 that is positionable between the sections 138, 139 of the interface frame but is also removable from between the sections. The interface plate 140 may also be positionable adjacent to or against the exterior surface of the housing segment 134. The interface frame 136 and the interface plate 140 may be removably connectable to each other by a connection structure which may include a plate flange 142 on the interface plate, a frame flange 144 on one or both sections 138, 139 of the interface frame 136, and fasteners that removably fasten the interface plate flange to the interface frame flange or flanges. Holes may be formed in the flanges 142, 144 in arrays that are able to align or register with each other to permit the passage of a fasteners 146 therethrough. In some embodiments, the interface plate and interface frame sections may extend over or past a fold in the exterior surface of the housing segment 134 which may facilitate the suitable alignment of the interface plate with the interface frame, and the holes in the plate flange with the holes in the frame flange. Removal of the fasteners from the flanges of the plate and frame allows removal of the plate from the frame as well any elements carried or mounted on the plate.

The interface plate 140 may have an opening 148 formed therein through which elements of the drive train may extend, such as a driven shaft 150 on which the sprocket of the driven member 60 is mounted such that movement of the chain of the endless loop member rotates the driven shaft. In some embodiments, the driven shaft may protrude through the opening 148 and may be provided with splines or a key and keyway for mating to other elements of the drive train. The drive apparatus may further include a gearset for interfacing with the driven shaft 150 to transmit power to the drive apparatus. The gearset may include a gear ratio multiplier (or reducer) assembly 152 to adjust the speed of the driven shaft to a suitable rotational speed for the wheel or wheels 66 of the drive apparatus. The assembly 152 may have a flange 154 that is mounted on the interface plate 140 so that the structural interface and the housing segment are at least partially supported on the wheels. Use of the gear ratio multiplier assembly rather than sprockets and chains for speed adjustment permits a compact arrangement that facilitates the use of a relatively simplified structural interface for mounting the elements on the housing segment. Further, adjustments and wear that may sometimes accompany the use of chains and sprockets may be avoided.

In some embodiments, elements of the traction enhancement structure 80 may be mounted on the structural interface 132, such as on the interface plate, and the weight support 84 may extend from the plate in a substantially perpendicular relationship to the plate. Additionally, a support element may extend between the gearbox of the drive train and the weight support.

By this structure, the elements of the drive apparatus (such as the gearbox (or gearboxes) and wheels may be removed as a unit from the housing segment by removing the fasteners linking the interface plate to the interface frame, leaving the frame on the housing segment while the plate is removed. These elements of the drive unit may thus be easily serviced or even exchanged or interchanged when service or replacement is needed.

It should be appreciated from the foregoing description that, except when mutually exclusive, the features of the various embodiments described herein may be combined with features of other embodiments as desired while remaining within the intended scope of the disclosure.

It should also be appreciated that in the foregoing description and appended claims, that the terms "substantially" and "approximately," when used to modify another term, mean "for the most part" or "being largely but not wholly or completely that which is specified" by the modified term.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A modular storage bin sweep system for moving particulate matter across a floor surface of a bin, the system comprising:
   a sweep assembly including a plurality of units connectable together in a substantially linear array along a longitudinal axis, each of the units having a unit longitudinal axis, the sweep assembly having an inboard end for locating toward a center of the bin and an outboard end for locating toward a peripheral area of the bin, the sweep assembly comprising:
      a first one of the units being located at the inboard end;
      a second one of the units being located at the outboard end,
      a plurality of interconnected paddles movable in a succession on a path along at least a portion of the sweep assembly between the inboard and outboard ends;
      at least one wheel mounted on at least one of the units and configured to move the sweep assembly with respect to the floor surface below the sweep assembly; and
      a third one of the units positioned between the first and second units and comprising a pivot unit configured to carry a portion of the succession of interconnected paddles, the third unit including a pair of connected sections with each section being connected to an adjacent said unit of the array, the pivot unit including a pivot structure positioned between and connecting the sections to permit pivoting of a first section with respect to a second section and thereby to permit a degree of pivotability of the unit longitudinal axes of the adjacent units with respect to each other in the array of units of the sweep assembly;
   wherein the pivot structure includes:
      pivot arms extending from a first one of the connected sections, at least one of the pivot arms being positioned on each of the lateral sides of the first connected section such that the pivot arms are laterally spaced;
      pivot tabs extending from a second one of the connected sections, at least one of the pivot tabs being positioned on each of the lateral sides of the second connected section such that the pivot tabs are laterally spaced; and
      a pivot shaft extending laterally and connecting the pivot arm and pivot tab on a first lateral side together and the pivot arm and pivot tab on a second lateral side together.

2. The system of claim 1 wherein the pivot shaft extends along a substantially horizontal axis to permit pivoting about the horizontal axis but not about a vertical axis.

3. The system of claim 1 wherein the third unit is positioned between the first unit and the second unit in the substantially linear array.

4. The system of claim 1 wherein the at least one wheel is connected to the succession of interconnected paddles in a manner causing the at least one wheel to rotate.

5. A modular storage bin sweep system utilizing paddles to sweep particulate matter across a floor surface of a bin, the system comprising:
   a sweep assembly including a plurality of units connectable together in a substantially linear array, the sweep assembly having an inboard end for locating toward a center of the bin and an outboard end for locating toward a peripheral area of the bin, each of the units having a unit longitudinal axis, the sweep assembly comprising:
      a plurality of interconnected paddles movable in a succession on a path along at least a portion of the sweep assembly between the inboard and outboard ends;
      at least one of the units comprising a power unit configured to move the succession of paddles along the path of the sweep assembly; and
      at least one of the units comprising a drive unit configured to move the sweep assembly with respect to the floor surface of the bin below the sweep assembly, the drive unit including a housing;
      wherein the drive unit includes a drive apparatus comprising a gearset and at least one rotatable traction wheel rotated by the gearset, the at least one rotatable traction wheel being in contact with the floor surface such that rotation of the at least one rotatable traction wheel by the gearset moves the sweep assembly across the floor surface;
      wherein the gearset and the at least one rotatable traction wheel of the drive apparatus are removable from the housing of the drive unit as a unit.

6. The system of claim 5 additionally comprising a structural interface including a first interface element on the housing of the drive unit and a second interface element removably mounted on the first interface element, the gearset and the at least one traction wheel being mounted on the second interface element.

7. The system of claim 6 wherein the structural interface comprises an interface frame positioned on the housing of the drive unit, an interface plate positionable between sections of the interface frame, the interface frame and the interface plate being removably connectable to each other by a connection structure.

8. The system of claim 7 wherein the connection structure comprises a plate flange on the interface plate, a frame flange on the interface frame, and fasteners that removably fasten the interface plate flange to the interface frame flange.

9. The system of claim 5 wherein the drive unit is configured such that removal of the gearset and the at least one rotatable traction wheel of the drive apparatus from the housing of the drive unit takes the at least one rotatable traction wheel out of contact with the floor surface.

10. The system of claim 5 wherein the drive apparatus extends substantially horizontally outward from the housing of the drive unit to position the at least one rotatable traction wheel rearwardly of the housing of the drive unit.

11. The system of claim 5 wherein the drive apparatus is positioned against a vertical side of the housing of the drive unit.

12. The system of claim 5 wherein the housing of the drive unit is at least partially supported on the at least one rotatable traction wheel.

13. The system of claim 5 wherein at least one of the units comprises a pivot unit configured to carry a portion of the succession of interconnected paddles, the pivot unit including a pair of connected sections with each section being connected to an adjacent said unit of the array, the pivot unit including a pivot structure positioned between and connecting the sections to permit pivoting of a first section with respect to a second section and thereby to permit a degree of pivotability of the unit longitudinal axes of the adjacent units with respect to each other in the array of units of the sweep assembly.

14. The system of claim 13 wherein the pivot structure includes:
   a pair of laterally-spaced pivot arms on a first one of the connected sections such that at least one of the pivot arms is positioned on each of the lateral sides of the first connected section;
   a pair of laterally-spaced pivot tabs on a second one of the connected sections such that at least one of the pivot tabs is positioned on each of the lateral sides of the second connected section; and
   a pivot shaft extending laterally and connecting the pivot arm and pivot tab on a first lateral side together and the pivot arm and pivot tab on a second lateral side together.

15. The system of claim 13 wherein the pivot shaft extends along a substantially horizontal axis to permit pivoting about the horizontal axis but not about a vertical axis.

16. The system of claim 13 wherein the pivot unit is positioned between the power unit and the drive unit in the substantially linear array.

17. The system of claim 13 wherein the at least one rotatable traction wheel is connected to the succession of interconnected paddles in a manner causing the at least one rotatable traction wheel to rotate.

18. A modular storage bin sweep system for moving particulate matter across a floor surface of a bin, the system comprising:
   a sweep assembly including a plurality of units connectable together in a substantially linear array along a longitudinal axis, each of the units having a unit longitudinal axis, the sweep assembly having an inboard end for locating toward a center of the bin and an outboard end for locating toward a peripheral area of the bin, the sweep assembly comprising:
   a first one of the units being located at the inboard end;
   a second one of the units being located at the outboard end, a plurality of interconnected paddles movable in a succession on a path along at least a portion of the sweep assembly between the inboard and outboard ends;
   at least one wheel mounted on at least one of the units and configured to move the sweep assembly with respect to the floor surface below the sweep assembly; and
   a third one of the units positioned between the first and second units and comprising a pivot unit configured to carry a portion of the succession of interconnected paddles, the third unit including a pair of sections with each section being attached to an adjacent said unit of the array, the pivot unit including a pivot structure positioned between and connecting the sections to permit pivoting of a first section with respect to a second section and thereby to permit a degree of pivotability of the unit longitudinal axes of the adjacent units with respect to each other in the array of units of the sweep assembly;
   wherein the pivot structure includes:
   laterally-spaced pivot arms extending from one of the sections of the pivot unit;
   laterally-spaced pivot tabs extending from an other one of the sections of the pivot unit; and
   a pivot shaft extending laterally and connecting together the pivot arm and pivot tab located toward a first lateral side of the pivot unit and connecting together the pivot arm and pivot tab located toward a second lateral side of the pivot unit.

19. The system of claim 18 wherein each of the pivot arms are positioned on opposite lateral sides of the first connected section and each of the pivot tabs are positioned on opposite lateral sides of the second connected section.

* * * * *